US005631752A

United States Patent [19]

Tanaka

[11] Patent Number: 5,631,752

[45] Date of Patent: May 20, 1997

[54] ANTIFERROELECTRIC LIQUID CRYSTAL DISPLAY ELEMENT EXHIBITING A PRECURSOR TILT PHENOMENON

[75] Inventor: Tomio Tanaka, Hachioji, Japan

[73] Assignee: Casio Computer Co., Ltd., Tokyo, Japan

[21] Appl. No.: 169,578

[22] Filed: Dec. 17, 1993

[30] Foreign Application Priority Data

| | | | |
|---|---|---|---|
| Dec. 24, 1992 | [JP] | Japan | 4-343709 |
| Dec. 24, 1992 | [JP] | Japan | 4-343980 |
| Dec. 24, 1992 | [JP] | Japan | 4-344264 |

[51] Int. Cl.[6] .......... G02F 1/1343

[52] U.S. Cl. .......... 349/173; 349/172

[58] Field of Search .......... 359/56, 100, 84; 345/97

[56] References Cited

U.S. PATENT DOCUMENTS

| | | | |
|---|---|---|---|
| 5,151,804 | 9/1992 | Verhulst et al. | 359/56 |
| 5,200,846 | 4/1993 | Hiroki et al. | 359/57 |
| 5,207,947 | 5/1993 | Suzuki et al. | 259/299.67 |
| 5,214,523 | 5/1993 | Nito et al. | 359/100 |
| 5,349,367 | 9/1994 | Wakita | 345/97 |
| 5,353,136 | 10/1994 | Escher et al. | 359/100 |

OTHER PUBLICATIONS

"Trustable Switching in Surface Stabilized Ferroelectric Liquid Crystals with a Large Spontaneous Polarization", Chandoni et al, May 1988 Japanese Journal of Applied Physics.

*Primary Examiner*—William L. Sikes
*Assistant Examiner*—James A. Dudek
*Attorney, Agent, or Firm*—Frishauf, Holtz, Goodman, Langer & Chick, P.C.

[57] ABSTRACT

Pixel electrodes and active elements for supplying data signals to the pixel electrodes in accordance with control signals are formed on one of a pair of opposing transparent substrates, and a counter electrode is formed on the other substrate. An antiferroelectric liquid crystal having a small difference between a voltage for changing liquid crystal molecules from the first or second ferroelectric phase to an antiferroelectric phase as an intermediate aligned state between the first and second ferroelectric phase and a voltage for changing the liquid crystal molecules from the antiferroelectric phase to the first or second ferroelectric phase and having optical characteristics changing along a curve in accordance with the applied voltage is sealed between the substrates.

15 Claims, 21 Drawing Sheets

FRAME 1
FRAME 2
FRAME 3
FRAME 4
FS
F0
FR
SCANNING SIGNAL

0
DATA SIGNAL

INTER-ELECTRODE VOLTAGE

VR'
VD
WRITE VOLTAGE
Von
Voff
VD'
VR
-Voff
-Von
RESET VOLTAGE

TRANSMITTANCE
Ton
Toff

ANTIFERROELECTRIC LIQUID CRYSTAL DISPLAY ELEMENT EXHIBITING A PRECURSOR TILT PHENOMENON

BACKGROUND OF THE INVENTION

1. Field of the Invention

The present invention relates to an antiferroelectric liquid crystal display device and a apparatus, and methods of driving the same.

2. Description of the Related Art

In recent years, an antiferroelectric liquid crystal display device having a larger field angle and a higher response than those of a conventional TN type liquid crystal display device has received a great deal of attention.

Ferroelectric liquid crystal display devices are classified into a ferroelectric liquid crystal display device using a ferroelectric liquid crystal exhibiting bistable characteristics (bistable states) in the aligned states of liquid crystal molecules, and an antiferroelectric liquid crystal display device using an antiferroelectric liquid crystal exhibiting tristable characteristics in the aligned states of liquid crystal molecules. Extensive studies have been recently made on antiferroelectric liquid crystal display devices.

The antiferroelectric liquid crystal display device exhibits tristable characteristics in the aligned states of the liquid crystal molecules. When a voltage exceeding the first threshold value is applied to the element, the liquid crystal is oriented in the first or second ferroelectric phase in which the molecules align in the first or the second direction, in accordance with the polarity of the voltage applied to the element. When a voltage having a value smaller than the second threshold value smaller than the first threshold value is applied to the antiferroelectric liquid crystal display device, the liquid crystal is aligned in an antiferroelectric phase in which the molecules point in an intermediate direction between the first and second directions. For this reason, the transmission axes of a pair of polarizing plates located on both sides of the liquid crystal display device are set with reference to the optical axis of the antiferroelectric phase to control the light transmittance, thereby displaying an image.

The antiferroelectric liquid crystal has a memory function (bistable states) of maintaining the aligned state in the first or second ferroelectric phase or the antiferroelectric phase regardless of changes in applied voltage to the liquid crystal if this voltage falls within the range between the first and second threshold values. A conventional antiferroelectric liquid crystal display device utilizes this memory function of the aligned state and is therefore driven in accordance with a simple matrix scheme.

The memory function of the aligned state of the antiferroelectric liquid crystal is enhanced as the difference between the first and second threshold values is larger. For this reason, the conventional antiferroelectric liquid crystal display device driven by the simple matrix scheme uses an antiferroelectric liquid crystal having a large difference between the first and second threshold values.

In the liquid crystal display device using the liquid crystal having a large difference between the first and second threshold values, a drive voltage for the liquid crystal display device is inevitably high. For this reason, it is difficult to drive the conventional antiferroelectric liquid crystal display device, using a conventional liquid crystal display device drive LSI.

The antiferroelectric liquid crystal has a high response speed in alignment from the antiferroelectric phase to the first or second ferroelectric phase. However, it has a low response speed in alignment from the first or second ferroelectric phase to the antiferroelectric phase. For this reason, when liquid crystal molecules are to be aligned in the antiferroelectric phase in the liquid crystal display device of a simple matrix type, the selection period may end before the liquid crystal is perfectly aligned in the antiferroelectric phase. If this occurs, the contrast of the display image is lowered. When the selection period is prolonged to prevent the above trouble, it is difficult to drive the antiferroelectric liquid crystal display device at a high duty ratio.

The voltage vs. transmittance characteristics of the conventional antiferroelectric liquid crystal display device have a large hysteresis, as shown in FIG. 1. In the graph of FIG. 1, the maximum transmittance of the liquid crystal display device is defined as 100%, and the minimum transmittance is defined as 0%. When a large hysteresis is present in the voltage vs. transmittance characteristics, the transmittance of the antiferroelectric liquid crystal display device greatly varies even if a voltage applied to the element is kept unchanged. For this reason, it is difficult to control the transmittance so as to perform gradation display.

SUMMARY OF THE INVENTION

The present invention has as its first object to provide an antiferroelectric liquid crystal display device capable of displaying an image having a high contrast level and a method of driving the same.

It is the second object of the present invention to provide an antiferroelectric liquid crystal display device which can be driven at a high duty ratio and a method of driving the same.

It is the third object of the present invention to provide an antiferroelectric liquid crystal display device capable of performing gradation display and a method of driving the same.

In order to achieve the above objects according to the first aspect of the present invention, there is provided an antiferroelectric liquid crystal display device of an active matrix type, comprising:

- a liquid crystal cell of the active matrix type including one substrate having a plurality of pixel electrodes and a plurality of active elements connected to the pixel electrodes, the pixel electrodes and the active elements being arranged in a matrix form, and the other substrate having a counter electrode opposing the pixel electrodes; and
- an antiferroelectric liquid crystal sealed in the liquid crystal cell and having first and second ferroelectric phases in which aligned states of liquid crystal molecules have different directions and an antiferroelectric phase exhibiting an intermediate aligned state between the first and second ferroelectric phases, so that a difference between a voltage for changing the first or second ferroelectric phase to the antiferroelectric phase and a voltage for changing the antiferroelectric phase to the first or second ferroelectric phase is not more than 6V.

If antiferroelectric liquid crystal has a difference of 3V or less between the voltage for changing the first or second ferroelectric phase to the antiferroelectric phase and the voltage for changing the antiferroelectric phase to the first or second ferroelectric phase, and has characteristics whose optical characteristics change along a curve in accordance with an applied voltage to the liquid crystal, the antiferroelectric liquid crystal can perform gradation display.

The ferroelectric liquid crystal for performing gradation display exhibits an antiferroelectric-ferroelectric phase transition precursor phenomenon. The ferroelectric liquid crystal may exhibit the antiferroelectric phase in only a voltage range of ±0.7V or have characteristics wherein the average direction of the long axes of molecules does not coincide with a direction normal to a liquid crystal layer at a zero voltage, but coincides with the direction normal to the liquid crystal layer at a first or second voltage, both of which are nonzero voltages.

According to the second aspect of the present invention, there is provided a method of driving a liquid crystal display device of an active matrix type, comprising the steps of:

preparing an antiferroelectric liquid crystal display device having one substrate on which a plurality of pixel electrodes and a plurality of active elements connected to the pixel electrodes are arranged in a matrix form, the other substrate on which a counter electrode opposing the pixel electrodes is formed, and an antiferroelectric liquid crystal sealed between the substrates and having first and second ferroelectric phases in which liquid crystal molecules have different aligned states, an antiferroelectric phase, and an intermediate optical state, between the ferroelectric phases and the antiferroelectric phase, caused by a phase transition precursor phenomenon;

simultaneously applying, between the pixel and counter electrodes, an initializing voltage for setting the liquid crystal in one of the first and second ferroelectric phases and the antiferroelectric phase for a first half selection period included in a selection period of each pixel constituted by one of the pixel electrodes, the counter electrode, and the antiferroelectric liquid crystal sealed between the pixel and counter electrodes, the selection period of each pixel including the first half selection period and a second half selection period; and applying a write voltage between the pixel and counter electrodes for the second half selection period, the write voltage changing in accordance with a display gradation level and setting the liquid crystal in the intermediate optical state caused by the phase transition precursor phenomenon.

For example, the first half selection period has a common timing for a plurality of rows in the matrix, and the second half selection period has different timings in units of rows in the matrix.

According to the third aspect of the present invention, there is provided an antiferroelectric liquid crystal display apparatus comprising:

one substrate on which a plurality of scanning electrodes are formed;

the other substrate on which a plurality of signal electrodes extending in a direction substantially perpendicular to the scanning electrodes are formed;

an antiferroelectric liquid crystal sealed between one substrate and the other substrate and having first and second ferroelectric phases in which liquid crystal molecules have different aligned states, and an antiferroelectric phase; and driving means, connected to the scanning and signal electrodes, for applying a voltage for aligning the antiferroelectric liquid crystal in the antiferroelectric phase between the scanning and signal electrodes for a nonselection period of each pixel.

The driving means, for example, applies a voltage for aligning the antiferroelectric liquid crystal in the antiferroelectric phase between the scanning and signal electrodes in a final period of the nonselection period of each pixel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 18A to 18D are views showing a write sequence according to the first driving method, in which FIGS. 18A and 18D show contents of one frame and FIGS. 18B and 18C show contents of eight rows;

DETAILED DESCRIPTION OF THE PREFERRED EMBODIMENTS

Preferred embodiments of the present invention will be described with reference to the accompanying drawings.

FIRST EMBODIMENT

Figure 2:
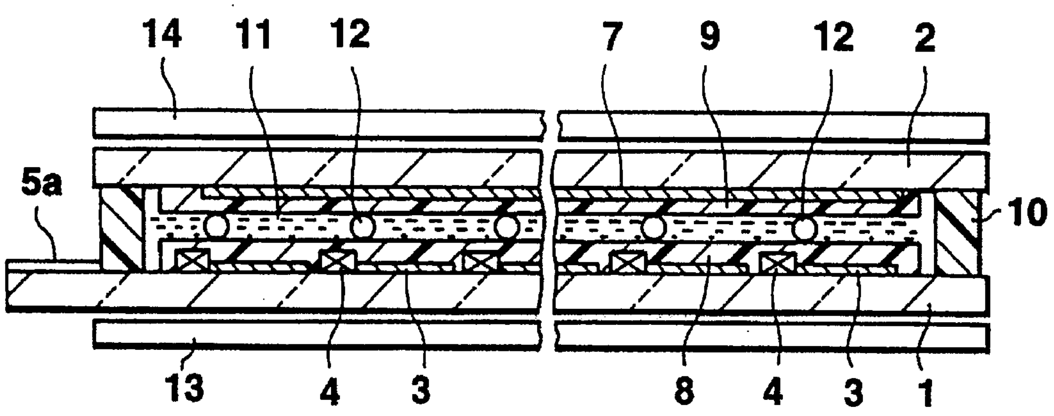
FIG. 2 is a sectional view of an antiferroelectric liquid crystal display device according to the first embodiment of the present invention.

The structure of an antiferroelectric liquid crystal display device according to the first embodiment of the present invention will be described below. FIG. 2 is a sectional view of this antiferroelectric liquid crystal display device, FIG. 3 is a plan view of a substrate on which pixel electrodes and active elements are formed, and FIG. 4 is a view showing the relationship between two ferroelectric phases of the antiferroelectric liquid crystal, the optical axis of an antiferroelectric phase, and the transmission axes of a pair of polarizing plates.

This antiferroelectric liquid crystal display device is of an active matrix scheme. The antiferroelectric liquid crystal display device has a pair of transparent substrates (e.g., glass substrates) 1 and 2. Referring to FIG. 2, transparent pixel electrodes 3 and active elements 4 electrically connected to the pixel electrodes 3 are formed on the lower-side substrate (to be referred to as a lower substrate hereinafter) 1 in a matrix form.

The active elements 4 are constituted by, e.g., thin film transistors (to be referred to as TFTs hereinafter). Each TFT 4 comprises a gate electrode formed on the lower substrate 1, a gate insulating film which covers the gate electrode, a semiconductor layer formed on the gate insulating film, and source and drain electrodes formed on the semiconductor layer.

Figure 3:
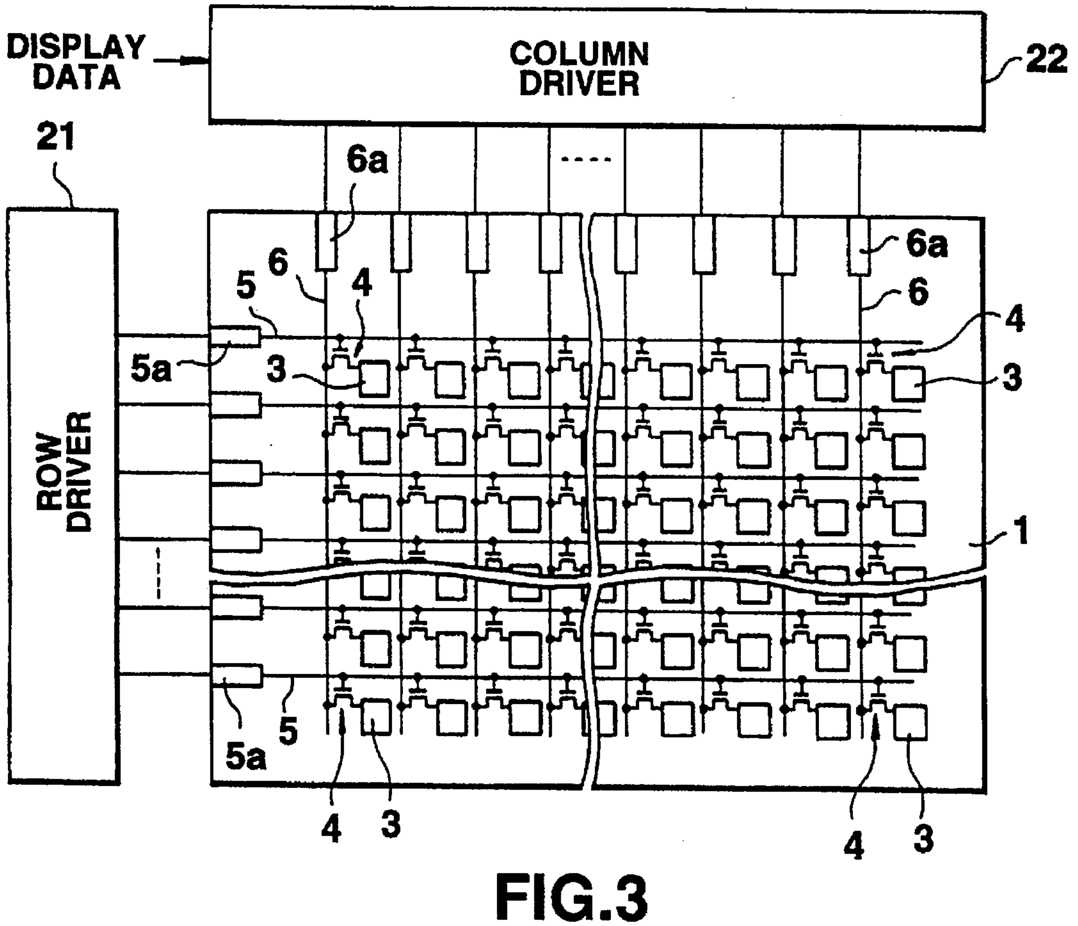
FIG. 3 is a plan view showing a substrate on which pixel electrodes and active elements of the above liquid crystal display device are formed.
Figure 4:
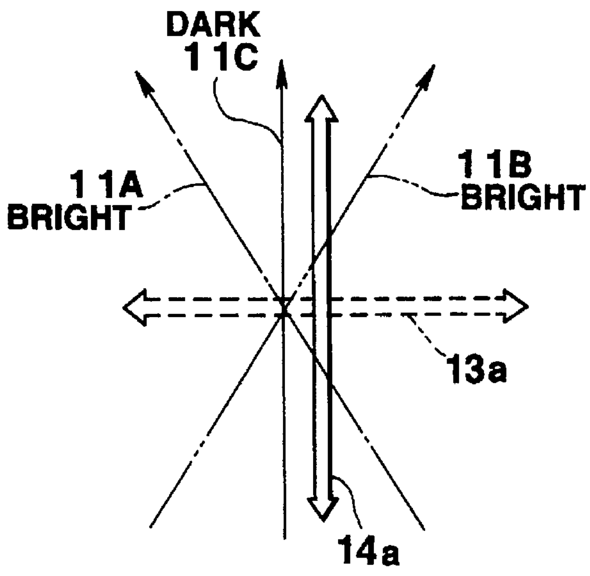
FIG. 4 is a view showing the relationship between the orientation directions of liquid crystal molecules in two ferroelectric phases of the antiferroelectric liquid crystal, the direction of the optical axis of an antiferroelectric phase, and the directions of the transmission axes of a pair of polarizing plates.

Gate lines (scanning lines) 5 are formed between the row pixel electrodes 3, and data lines (gradation signal lines) 6 are formed between the column pixel electrodes 3, as shown in FIG. 3. The gate electrode of each TFT 4 is connected to the corresponding gate line 5, and the drain electrode is connected to the corresponding data line 6.

Each gate line 5 is connected to a row driver 21 through an end portion *5a*, and each data line 6 is connected to a column driver 22 through an end portion *6a*. The row driver 21 applies a gate pulse to scan a desired gate line 5. On the other hand, the column driver 22 receives display data (gradation data) and applies a data signal corresponding to the display data to a desired data line 6.

The gate line 5 is covered with the gate insulating film (transparent film) of the TFT 4 except for the end portion *5a*. Each data line 6 is formed on this gate insulating film. Each pixel electrode 3 is formed on the gate insulating film and connected to the source electrode of the corresponding TFT 4 at one end portion of the pixel electrode.

Referring to FIG. 2, a transparent counter electrode 7 opposing each pixel electrode 3 on the lower substrate is formed on an upper-side electrode (to be referred to as an upper substrate) 2. The counter electrode 7 is constituted by one electrode which covers the entire display area and is applied with a predetermined reference voltage V0.

Aligning films 8 and 9 are formed on the electrode formation surfaces of the lower and upper substrates 1 and 2, respectively. The aligning films 8 and 9 are horizontal aligning films consisting of an organic polymer compound such as polyimide. An aligning treatment such as rubbing is performed on the opposite surfaces of the aligning films 8 and 9.

The lower and upper substrates 1 and 2 are adhered to each other through a frame-like seal member 10 at their edge, and the distance between the lower and upper electrodes 1 and 2 is 7 to 20 μm. An antiferroelectric liquid crystal 11 is sealed in a space defined by the seal member 10 between the substrates 1 and 2.

Referring to FIG. 2, reference numerals 12 denote transparent gap members which regulate the distance between the substrates 1 and 2. These gap members 12 are distributed in the liquid crystal sealing area.

A pair of polarizing plates 13 and 14 are disposed above and under the liquid crystal display device. The relationship between the transmission axes of the polarizing plates 13 and 14 is determined with reference to the optical axis of the antiferroelectric phase.

This will be described in detail with reference to FIG. 4. Referring to FIG. 4, reference numerals 11A, 11B, and 11C denote the orientation directions of liquid crystal molecules in two ferroelectric phases and the direction of the optical axis of the antiferroelectric phase of the antiferroelectric liquid crystal 11, respectively.

When a voltage having one polarity and a value equal to or larger than a predetermined threshold value (ON threshold voltage) is applied to the antiferroelectric liquid crystal 11, the liquid crystal molecules of the antiferroelectric liquid crystal 11 are aligned in the first direction 11A indicated by a chain line. When a voltage having the opposite polarity and equal to or larger than the ON threshold voltage is applied to the antiferroelectric liquid crystal 11, the liquid crystal molecules of the antiferroelectric liquid crystal 11 are aligned in the second direction 11B indicated by a chain double-dashed line. When a voltage lower than the ON threshold voltage (OFF threshold voltage) is applied to the antiferroelectric liquid crystal 11, the antiferroelectric liquid crystal 11 is aligned so that its optical axis is directed in the third direction 11C indicated by a solid line.

Referring to FIG. 4, reference numerals 13*a* and 14*a* denote the transmission axis of the lower-side polarizing plate (to be referred to as a lower polarizing plate hereinafter) 13 and the transmission axis of the upper-side polarizing plate (to be referred to as an upper polarizing plate hereinafter) 14, respectively. The transmission axis 13*a* of the lower polarizing plate 13 is almost perpendicular to the third direction 11C of the antiferroelectric liquid crystal 11, and the transmission axis 14*a* of the upper polarizing plate 14 is almost parallel to the third direction 11C.

In the antiferroelectric liquid crystal display device wherein the transmission axes of the polarizing plates 13 and 14 are set as described above, the transmittance becomes maximum (brightest display) in a ferroelectric phase in which the long axes of the liquid crystal molecules align almost in the first or second direction 11A or 11B, and the transmittance becomes minimum (darkest display) in the antiferroelectric phase in which the long axes of the liquid crystal molecules align almost in the third direction 11C due to the following reason. In a state wherein the antiferroelectric liquid crystal 11 is aligned in the first or second ferroelectric phase, linearly polarized light passing through one polarizing plate 13 is polarized by the antiferroelectric liquid crystal 11 into non-linearly polarized light. A given polarized component of the non-linearly polarized light passes through and emerges from the other polarizing plate 14, thereby almost maximizing the transmittance. In a state wherein the antiferroelectric liquid crystal 11 is aligned in the antiferroelectric phase, the liquid crystal molecules are alternately aligned in the first and second directions 11A and 11B in units of SmC*-phase layers. The average orientation direction is a direction normal to the SmC*-phase layers, and the optical axis of the antiferroelectric liquid crystal 11 also agrees with the direction normal to the SmC*-phase layers. Therefore, linearly polarized light passing through one polarizing plate 13 is hardly polarized and passes through the liquid crystal layers without any polarization. Most of the transmitted light is absorbed by the other polarizing plate 14, thereby almost minimizing the transmittance.

The antiferroelectric liquid crystal 11 is aligned in the first ferroelectric phase in which the liquid crystal molecules align in the first direction, the second ferroelectric phase in which the liquid crystal molecules align in the second direction, and the antiferroelectric phase as an intermediate state between the first and second ferroelectric phases. In the antiferroelectric liquid crystal 11, the helical pitch of the chiral smectic C phase is larger than the distance between the substrates. The antiferroelectric liquid crystal 11 is sealed between the substrates 1 and 2 in a state wherein its helical structure is not manifested. According to this embodiment, the characteristic point of the antiferroelectric liquid crystal 11 lies in that absolute value of a voltage applied to change the antiferroelectric liquid crystal from the antiferroelectric phase to the first or second ferroelectric phase is low, and the difference between a voltage applied to change the antiferroelectric liquid crystal 11 from the first or second ferroelectric phase to the antiferroelectric phase and a voltage applied to change the antiferroelectric liquid crystal 11 from the antiferroelectric phase to the first or second ferroelectric phase is 6V or less (preferably 5V or less), which is very low (normally, 10V or more). Therefore, this antiferroelectric liquid crystal 11 has a low memory function level in an aligned state.

Figure 5:
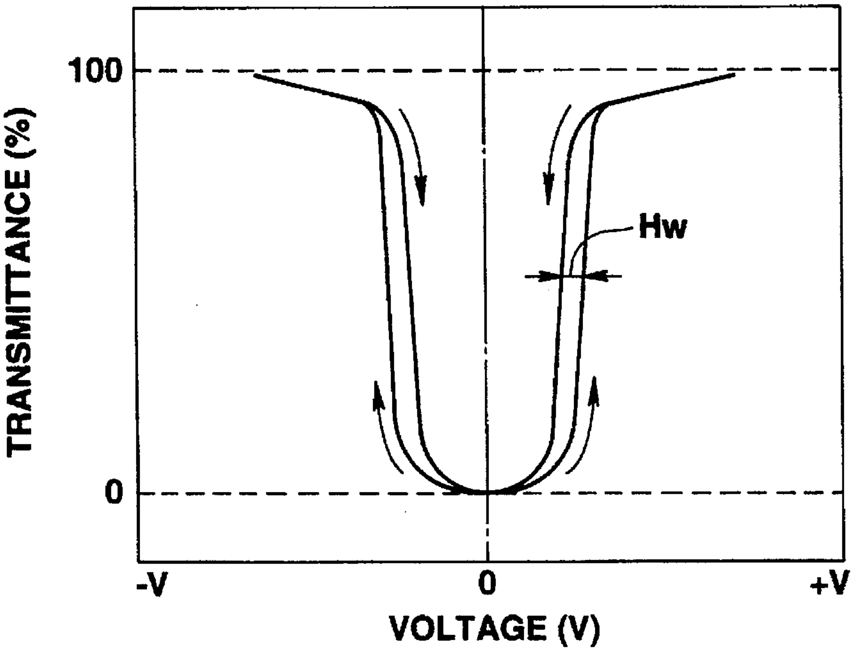
FIG. 5 is a graph showing the voltage vs. transmittance characteristics of the liquid crystal display device of the first embodiment of the present invention.

FIG. 5 shows the voltage vs. transmittance characteristics obtained when a triangular wave voltage having a very low frequency of about 0.1 Hz is applied between the pixel and counter electrodes 3 and 7 of the above liquid crystal display device. The maximum transmittance of the display device is defined as 100%, and the minimum transmittance is defined as 0% FIG. 5, as in FIG. 1. As shown in FIG. 5, the liquid crystal display device using the antiferroelectric liquid crystal having the above characteristics has a hysteresis in its voltage vs. transmittance characteristics. A hysteresis width $H_w$ at a 50% transmittance point (i.e., a point at which the liquid crystal molecules change from the first or second ferroelectric phase to the antiferroelectric phase or from the antiferroelectric phase to the first or second ferroelectric phase) is as small as 5V or less.

With this arrangement, each TFT 4 is set in an ON state during the selection period of one frame and set in an OFF state during the nonselection period thereof. The voltage applied between the pixel and counter electrodes 3 and 7 during the selection period is held even during the nonselection period. For this reason, the antiferroelectric liquid crystal 11 has a low memory function level in the aligned state, as described above (i.e., the difference between the voltage applied for changing the antiferroelectric liquid crystal from the first or second ferroelectric phase to the antiferroelectric phase and the voltage applied to change the antiferroelectric liquid crystal from the antiferroelectric phase to the first or second ferroelectric phase is small), but this aligned state is maintained even during the nonselection period. Therefore, the aligned state of the liquid crystal molecules is controlled in accordance with the applied voltage to obtain a desired transmittance, thereby displaying an image.

When the above voltage difference is small, the applied voltage (i.e., a voltage for aligning the liquid crystal molecules in the first or second direction 11A or 11B) for aligning the antiferroelectric liquid crystal 11 in the first or second ferroelectric phase need not be much higher than the voltage applied for aligning the antiferroelectric liquid crystal in the antiferroelectric phase. Therefore, the drive voltage can be low.

With the above arrangement, since the voltage applied between the electrodes 3 and 7 during the selection period is maintained even during the nonselection period, the aligning operation of the antiferroelectric liquid crystal 11 need not be terminated within the selection period. Therefore, the selection period (write time) of each pixel need not be long, and the liquid crystal display device can be drive at a high duty ratio.

As in other liquid crystal display devices, the antiferroelectric liquid crystal display device is driven by alternately reversing the polarity of the applied voltage to prevent a display burn-in phenomenon caused upon application of a DC component exceeding an allowable value to the liquid crystal. The above liquid crystal display device has a small hysteresis in its voltage vs. transmittance characteristics. Even if the polarity of the applied voltage is reversed to drive the display device, the display screen will not flicker.

This point will be described in comparison with an active matrix drive type liquid crystal display device using a liquid crystal having a large difference between the voltage applied to align the liquid crystal in the first or second ferroelectric phase and the voltage applied to align the liquid crystal in the antiferroelectric phase.

Figure 1:
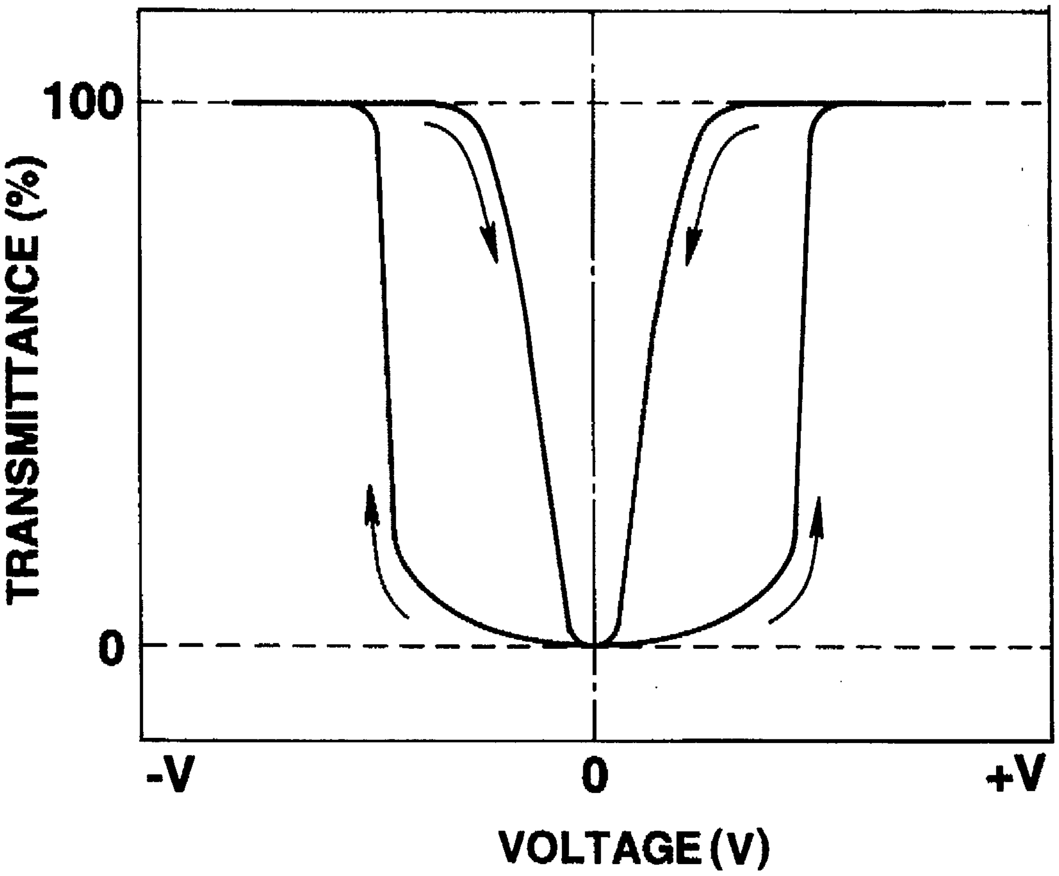
FIG.1 (PRIOR ART)
FIG. 1 is a graph showing the voltage vs. transmittance characteristics of a conventional antiferroelectric liquid crystal display device.
Figures 6A, 6B, 6C:
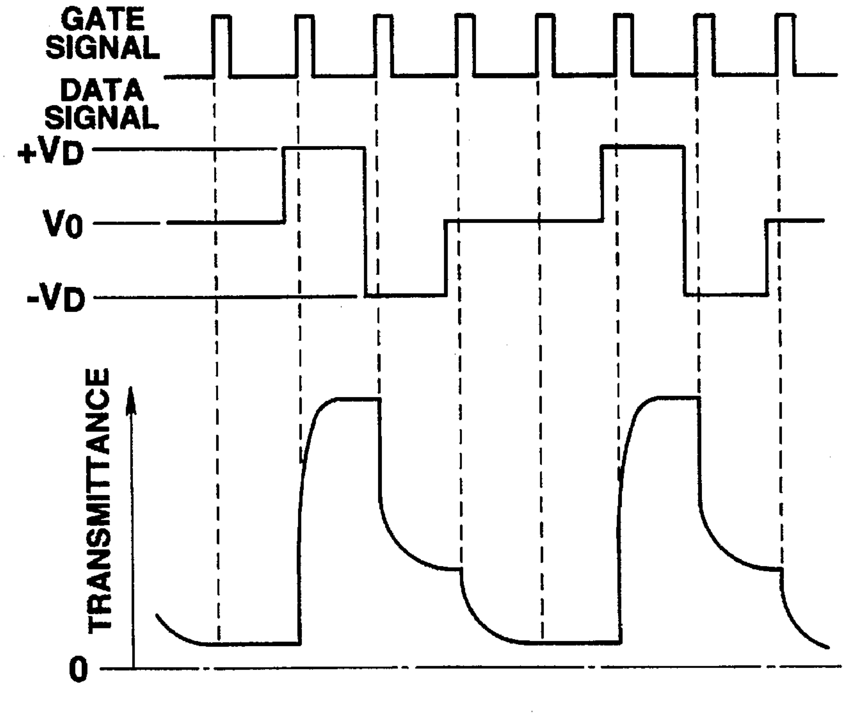
FIGS. 6A to 6C are timing charts of a gate signal, a data signal, and a transmittance which are obtained when the liquid crystal display device having the voltage vs. transmittance characteristics shown in FIG. 1 is driven in a drive test.

A gate signal (FIG. 6A) and a data signal (FIG. 6B) were applied to the comparative element of an active matrix type having a large hysteresis in its voltage vs. transmittance characteristics in FIG. 1 to measure electrooptic characteristics of this element. The measured electrooptic characteristics are shown in FIG. 6C. The data signal was a signal in which a positive write voltage +VD having positive polarity with respect to a reference voltage (the same voltage as that applied to the counter electrode 7) V0 and a negative write voltage −VD having a polarity opposite to and the same absolute value as those of the write voltage +VD were alternately repeated.

As shown in FIG. 6C, in the comparative element having a large hysteresis in its voltage vs. transmittance characteristics, even if the absolute values of the write voltages +VD and −VD are equal to each other, a transmittance obtained when the positive write voltage +VD is applied becomes different from that obtained when the negative write voltage −VD is applied, thereby causing flickering of the display screen.

Figures 7A, 7B, 7C:
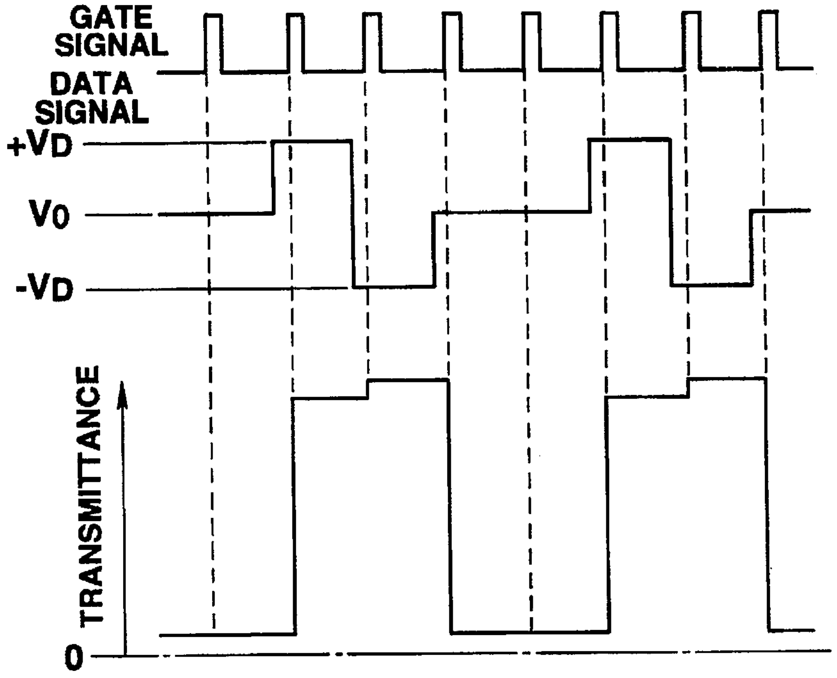
FIGS. 7A to 7C are timing charts of a gate signal, a data signal, and a transmittance which are obtained when the liquid crystal display device having the voltage vs. transmittance characteristics shown in FIG. 5 is driven in a drive test.

To the contrary, the liquid crystal display device of this embodiment was driven and tested in the same manner as described above. In this case, the waveforms of a gate signal and a data signal used in this test are shown in FIGS. 7A and 7B, respectively. Since the voltage for aligning the liquid crystal in the first or second ferroelectric phase was lower than that of the comparative element, the absolute values of the write voltages +VD and −VD were set smaller than that in the test of driving the comparative element.

As shown in FIG. 7C, in the liquid crystal display device of this embodiment, a transmittance obtained when the positive write voltage +VD was applied was almost equal to that obtained when the negative write voltage −VD was applied. Therefore, no flickering of the display screen occurred. This is because the voltage vs. transmittance characteristics of the liquid crystal display device have a small hysteresis shown in FIG. 5.

In the above embodiment, the hysteresis width of the antiferroelectric liquid crystal is set to 5V or less, but it is more preferably 3V or less.

This embodiment is also applicable to an antiferroelectric liquid crystal display device having a pair of polarizing plates arranged such that the liquid crystal provides a dark display when aligned in the first or second ferroelectric phase, and the liquid crystal provides a bright display when aligned in the antiferroelectric phase.

As described above, the antiferroelectric liquid crystal display device of this embodiment uses the antiferroelectric liquid crystal having a small difference between the voltage applied to change the liquid crystal from the first or second ferroelectric phase to the antiferroelectric phase and the voltage applied to change the liquid crystal from the antiferroelectric phase to the first or second ferroelectric phase. For this reason, the drive voltage can be set low, and a conventional drive LSI can be used to drive this liquid crystal display device. Although the liquid crystal has a low memory function level, a desired aligned state can be maintained even during the nonselection period to obtain a desired transmittance because the liquid crystal display device is of an active matrix type. Since alignment of the liquid crystal need not be completed within the selection period, the selection period can be shortened, and the display device can be driven at a high duty ratio. In addition, even if the polarity of the voltage applied to the display device is alternately reversed to drive the element, no flickering occurs because the display device has a small hysteresis.

SECOND EMBODIMENT

The first embodiment has exemplified the antiferroelectric liquid crystal display device for performing ON/OFF display operations. However, the present invention is also applicable to an antiferroelectric liquid crystal display device for performing gradation display. This antiferroelectric liquid crystal display device capable of performing gradation display will be described below.

The liquid crystal display device of this embodiment has the same structure as described with reference to FIGS. 2 to 4.

An antiferroelectric liquid crystal 11 of this embodiment has a very small difference of 3V or less and preferably 2V or less between a voltage for changing the aligned state of liquid crystal molecules from the first or second ferroelectric phase to an antiferroelectric phase as an intermediate aligned state between the first and second ferroelectric phases and a voltage for changing the aligned state of the liquid crystal molecules from the antiferroelectric phase to the first or second ferroelectric phase. For this reason, the transmittance of the liquid crystal display device of this embodiment is not adversely affected by the hysteresis and is determined almost uniquely with respect to the applied voltage. In addition, the antiferroelectric liquid crystal 11 of this embodiment has a relatively wide region exhibiting a precursor tilt phenomenon (antiferroelectric-ferroelectric phase transition precursor phenomenon) in which the tilt angle of the liquid crystal molecules with respect to the substrate surface changes with a change in voltage applied to the display device. Optical characteristics change with the change in tilt angle. Therefore, the liquid crystal display device of this embodiment has optical characteristics changing along a curve with a change in applied voltage.

Figure 8:
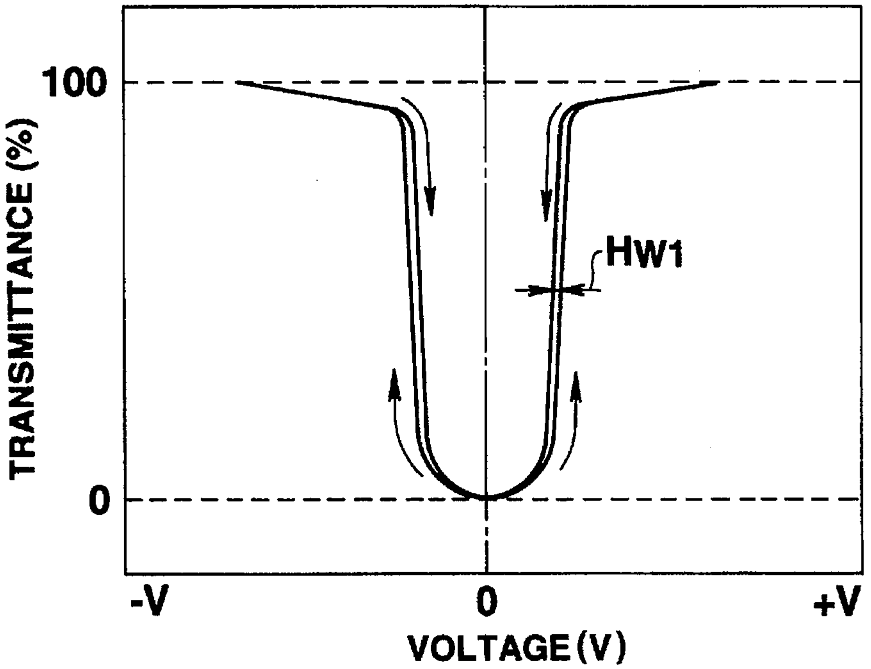
FIGS. 8 and 9 are graphs showing the voltage vs. transmittance characteristics of a liquid crystal display device according to the second embodiment of the present invention.
Figure 9:
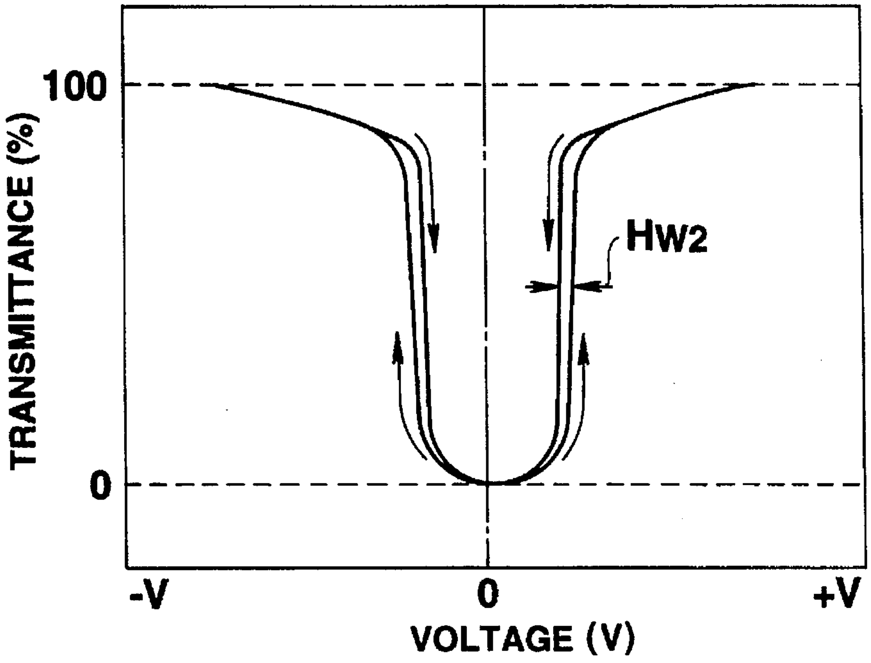

FIGS. 8 and 9 show results of changes in transmittance as a function of the voltage applied to liquid crystal display devices having two types of antiferroelectric liquid crystals having a small voltage difference (2V or less) and optical characteristics changing along a curve with the change in applied voltage. These results were obtained by applying a triangular wave voltage having a low frequency of about 0.1 Hz between electrodes (between pixel and counter electrodes 3 and 7). In FIGS. 8 and 9, the maximum transmittance of the liquid crystal display device was defined as 100%, and the minimum transmittance was defined as 0%.

As shown in FIGS. 8 and 9, the liquid crystal display device using the antiferroelectric liquid crystal having the above characteristics has a small hysteresis in its voltage vs. transmittance characteristics. Hysteresis widths $H_{w1}$ and $H_{w2}$ at a 50% transmittance point (i.e., a point at which the liquid crystal molecules change from the first or second ferroelectric phase to the antiferroelectric phase or from the antiferroelectric phase to the first or second ferroelectric phase) is as small as 2V or less. For this reason, the transmittance is not adversely affected by the past history of the applied voltage and is determined almost uniquely to correspond to the applied voltage. Therefore, an arbitrary transmittance can be obtained with good reproducibility by controlling the applied voltage.

In this antiferroelectric liquid crystal display device, the antiferroelectric liquid crystal 11 has optical characteristics changing along a curve with a change in voltage applied to the display device in accordance with the precursor tilt phenomenon. For this reason, the change in transmittance between the antiferroelectric and ferroelectric phases with a change in applied voltage is moderate. Voltage control for obtaining a desired transmittance can also be facilitated.

The antiferroelectric liquid crystal display device can display a gradation image upon control of the applied voltage because the transmittance as a function of the applied voltage can be almost uniquely determined, and the voltage control for obtaining a desired transmittance is relatively easy.

As in the first embodiment, a reference voltage V0, a gate signal for controlling an ON/OFF operation of each TFT 4, and a data signal corresponding to image data are applied to a counter electrode 7, a gate line 5, and a data line 6 to drive the antiferroelectric liquid crystal display device of this embodiment in accordance with an active matrix drive scheme. For this reason, a voltage applied between the counter electrode 7 and a pixel electrode 3 of each pixel during a selection period can be held between the electrodes 3 and 7 even during a nonselection period. Unlike simple matrix driving, a time for applying a voltage corresponding to a gradation level to be displayed can be sufficiently prolonged. The liquid crystal molecules can be properly set in a desired aligned state, and a desired transmittance can be obtained.

In the antiferroelectric liquid crystal display device of this embodiment, clear gradation display at a practical application level can be realized due to the reasons described above.

Figure 10:
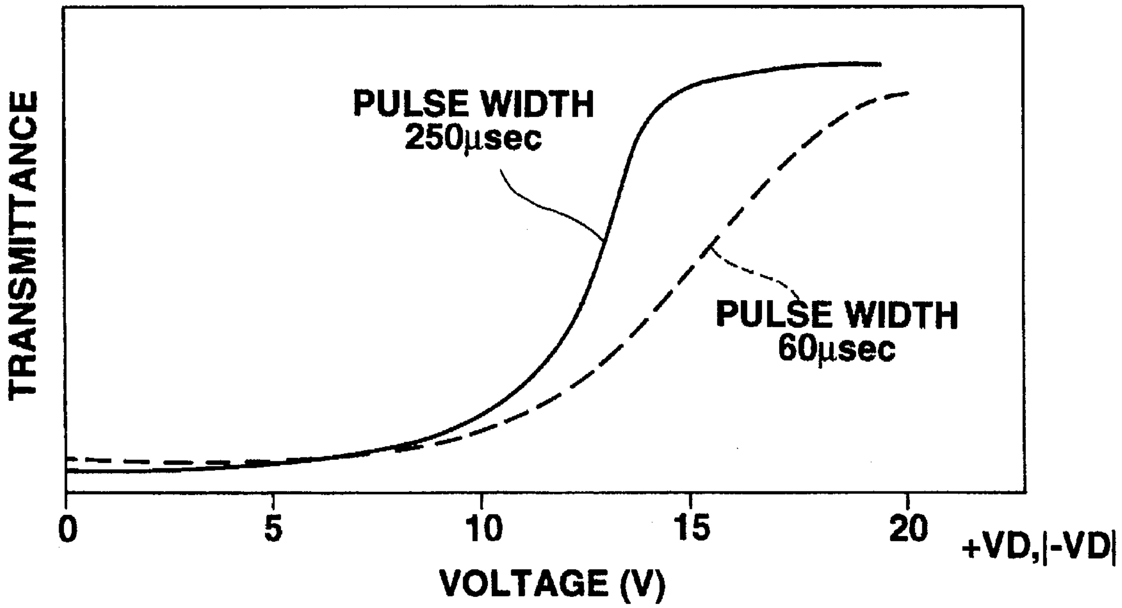
FIG. 10 is a graph showing changes in transmittance as a function of the voltage applied to the liquid crystal element having the voltage vs. transmittance characteristics shown in FIG. 8 in an actual application.
Figure 11:
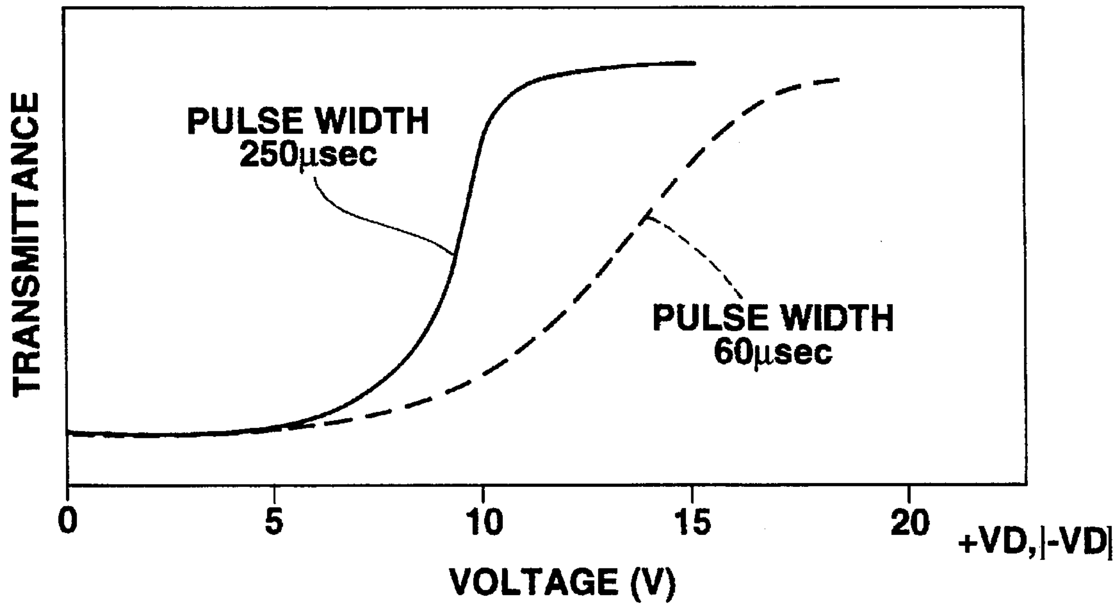
FIG. 11 is a graph showing changes in transmittance as a function of the voltage applied to the liquid crystal element having the voltage vs. transmittance characteristics shown in FIG. 9 in an actual application.
Figures 12A, 12B, 12C:
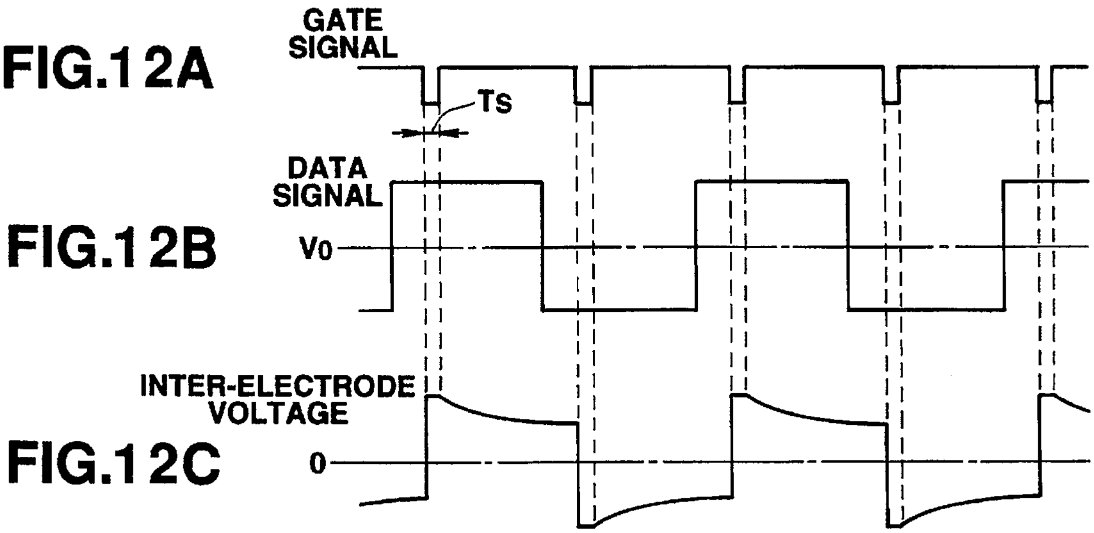
FIGS. 12A to 12C are timing charts of a gate signal, a data signal, and a voltage applied across the electrodes, all of which are supplied to the liquid crystal element so as to obtain the voltage vs. transmittance characteristics shown in FIGS. 10 and 11.

FIGS. 10 and 11 show changes in transmittances obtained when the liquid crystal display devices having the voltage vs. transmittance characteristics shown in FIGS. 8 and 9 are actually driven. FIG. 12A shows the waveform of the gate signal used in this drive test, FIG. 9B shows the waveform of the data signal, and FIG. 9C shows the waveform of the voltage (i.e., the voltage applied between the pixel and counter electrodes 3 and 7) applied between the electrodes. The data signal was a signal in which a write voltage +VD having positive polarity with respect to the reference voltage V0 and a negative write voltage −VD having a polarity opposite to and the same absolute value as those of the write voltage +VD were alternately repeated. This drive test was performed under the conditions that pulse widths TS of the gate signal were set to 250 μs and 60 μs, respectively.

In the liquid crystal display device having the voltage vs. transmittance characteristics shown in FIG. 8, the transmittance changed as indicated by a solid curve shown in FIG. 10 when the pulse width TS of the gate signal was set to 250 μs. The transmittance of this element changed as indicated by a broken curve in FIG. 10 when the pulse width of the gate signal was set to 60 μs. In the liquid crystal display device having the voltage vs. transmittance characteristics shown in FIG. 9, the transmittance changed as indicated by a solid curve shown in FIG. 11 when the pulse width TS of the gate signal was set to 250 μs. The transmittance of this element changed as indicated by a broken curve in FIG. 11 when the pulse width of the gate signal was set to 60 μs.

As can be apparent from FIGS. 10 and 11, in either liquid crystal display device, the transmittance changes with a change in voltage applied thereto. Therefore, the transmittance can be almost uniquely determined by controlling the applied voltage.

When the pulse width TS of the gate signal is decreased (60 μs in the above drive test), the maximum drive voltage increases as compared with the case of a large pulse width TS (250 μs in the above drive test). However, the change in transmittance as a function of the applied voltage becomes moderate. Therefore, when the pulse width TS of the gate signal is decreased, the range of the applied voltage can be widened to allow easy, accurate control of gradation levels.

In the liquid crystal display device of this embodiment, as in the first embodiment, the voltage for aligning the antiferroelectric liquid crystal 11 in the first or second ferroelectric phase need not be set excessively high with respect to the voltage for aligning the antiferroelectric liquid crystal 11 in the antiferroelectric phase. Therefore, the drive voltage can be set lower than the conventional case, and a commercially available LCD drive LSI can be used to drive the liquid crystal display device.

The liquid crystal display device of this embodiment is of an active matrix type, and the voltage applied between the electrodes during the selection period is held even during the nonselection period, thereby aligning the antiferroelectric liquid crystal 11 by this held voltage. The aligning operation of the antiferroelectric liquid crystal 11 need not be completed within the selection period. Even if the antiferroelectric liquid crystal 11 has a low response speed for aligning the liquid crystal molecules from the first or second ferroelectric phase to the antiferroelectric phase, the selection period need not be prolonged, and the display device can be driven at a high duty ratio.

This embodiment is also applicable to an antiferroelectric liquid crystal display device having a pair of polarizing plates arranged such that the liquid crystal provides a dark display when aligned in the first or second ferroelectric phase, and the liquid crystal provides a bright display when aligned in the antiferroelectric phase.

THIRD EMBODIMENT

An antiferroelectric liquid crystal display device capable of performing gradation display according to the third embodiment of the present invention will be described below.

The structure of the liquid crystal display device according to this embodiment is the same as that described with reference to FIGS. 2 to 4.

Figure 13A:
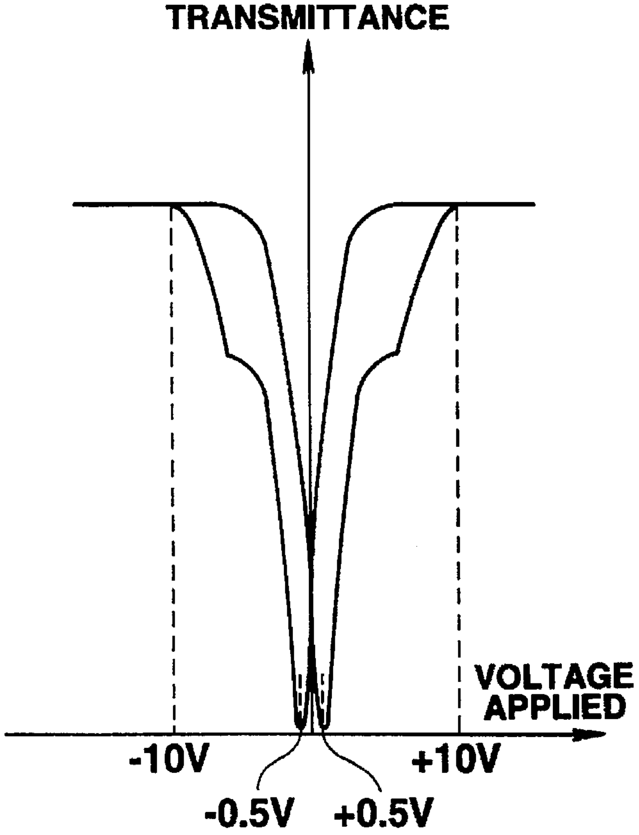
FIG. 13A is a graph showing electrooptic characteristics obtained when a triangular voltage having a low frequency is applied to the first antiferroelectric liquid crystal according to the third embodiment of the present invention.
Figure 14A:
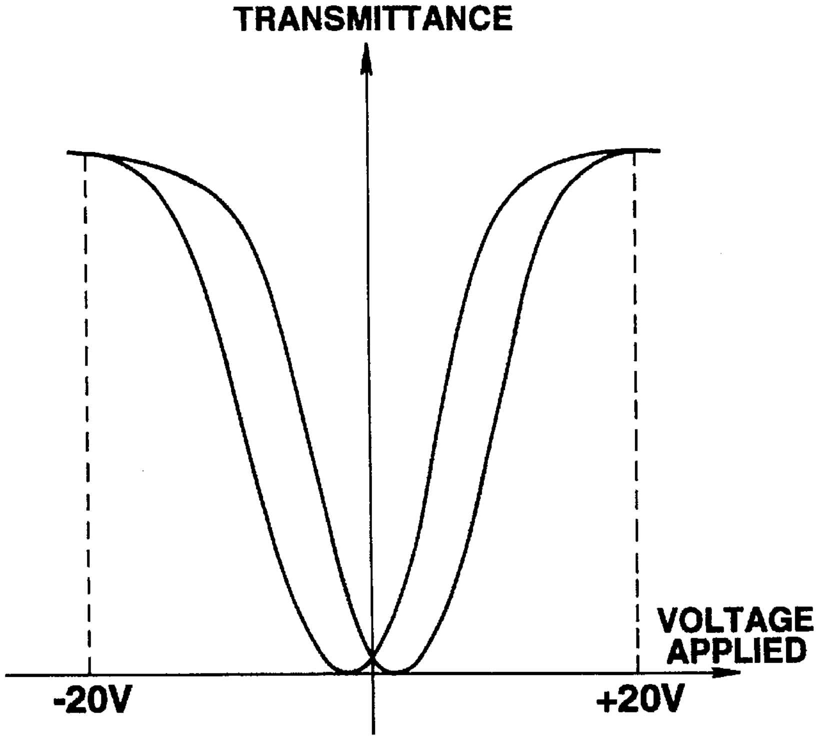
FIG. 14A is a graph showing electrooptic characteristics obtained when a triangular voltage having a low frequency is applied to the second antiferroelectric liquid crystal according to the third embodiment of the present invention.

An antiferroelectric liquid crystal 11 of this embodiment has characteristics shown in FIG. 13A or 14A.

In accordance with the applied electric field, each antiferroelectric liquid crystal 11 exhibits the first ferroelectric phase in which liquid crystal molecules align in one direction, the second ferroelectric phase in which the liquid crystal molecules align in the other direction different from one direction of the first ferroelectric phase, an antiferroelectric phase in an intermediate state (i.e., a state wherein the average direction of the long axes of liquid crystal molecules is aligned with a direction normal to the laminar structure of the liquid crystal) between the first and second ferroelectric phases, and a relatively wide antiferroelectric-ferroelectric phase transition precursor phenomenon. By this phase transition precursor phenomenon, the average direction of the long axes of the liquid crystal molecules is aligned in an arbitrary intermediate direction of the long axes between the antiferroelectric phase and the first or second ferroelectric phase in accordance with the strength of the applied electric field (voltage). The antiferroelectric liquid crystal 11 has a helical pitch larger than the distance between the substrates and is sealed between substrates 1 and 2 in a state wherein the helical structure is not manifested.

Two types of antiferroelectric liquid crystals used in liquid crystal display apparatuses of this embodiment will be described below.

First of all, FIG. 13A shows the relationship (electrooptic characteristics) between the applied voltage and the transmittance of the first antiferroelectric liquid crystal. These electrooptic characteristics are obtained such that a pair of polarizing plates are arranged, as shown in FIG. 4, and a triangular wave voltage having a sufficiently low frequency of about 0.1 Hz is applied to this antiferroelectric liquid crystal. This antiferroelectric liquid crystal exhibits an antiferroelectric phase (the average direction of the long axes of liquid crystal molecules is aligned in a direction normal to the layer of the laminar structure of the antiferroelectric liquid crystal) in only a very narrow applied voltage range of ±0.5V (±0.3V to 0.7V), and its characteristic curve is steep. A flat region is rarely present in the range (i.e., the range in which the applied voltage is almost 0V) (a general antiferroelectric liquid crystal has a wide region representing an antiferroelectric phase, and a flat portion is present in the central portion of the characteristic curve).

FIG. 14A shows the electrooptic characteristics of the second antiferroelectric liquid crystal. These characteristics are obtained such that a pair of polarizing plates are arranged, as shown in FIG. 8, and a triangular wave voltage having a sufficiently low frequency of about 0.1 Hz is applied to this antiferroelectric liquid crystal. In the antiferroelectric liquid crystal having these characteristics, the average direction of the long axes of the liquid crystal molecules is not aligned with a direction normal to the layer at a zero voltage, but is aligned therewith at two nonzero voltages, thereby minimizing the transmittance. That is, two separate voltage regions for a dark state are present, and no flat portion is present at a zero applied voltage.

In accordance with the field electric field, each antiferroelectric liquid crystal having the characteristics shown in FIG. 13A or 14A exhibits the first ferroelectric phase in which liquid crystal molecules align in a first direction 11A, the second ferroelectric phase in which the liquid crystal molecules align in a second direction 11B, an antiferroelectric phase in an intermediate state (i.e., a state wherein the average direction of the long axes of liquid crystal molecules is aligned with a direction normal to the laminar structure of the liquid crystal) between the first and second ferroelectric phases, and a relatively wide precursor tilt phenomenon (i.e., the antiferroelectric-ferroelectric phase transition precursor phenomenon). By this phase transition precursor phenomenon, the average direction of the long axes of the liquid crystal molecules is aligned in an arbitrary intermediate direction of the long axes between the antiferroelectric phase and the first or second ferroelectric phase in accordance with the strength of the electric field (voltage) applied to this liquid crystal.

Since the antiferroelectric liquid crystal of this type has a wide voltage application range which manifests an antiferroelectric-ferroelectric phase transition precursor phenomenon, it has an infinite number of intermediate optical states in accordance with the applied voltage. An appropriate intermediate optical state is selected and set to allow gradation display.

The first and second antiferroelectric liquid crystals have cone angles as large as 30° to 45° (preferably 35° or more) and spontaneous polarization as large as about 200 or more. In addition, either liquid crystal has a phase transition sequence of I, SmA (smectic A phase), and ASmC* (antismectic C* phase).

Figure 15A:
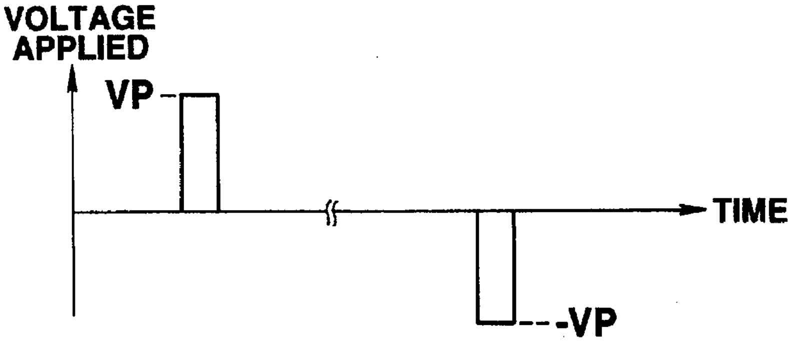
FIG. 15A is a waveform chart showing a conventional voltage waveform applied to the first and second antiferroelectric liquid crystals.
Figure 15B:
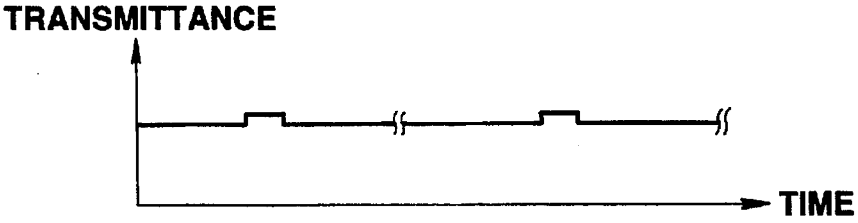
FIGS. 15B to 15D are graphs showing optical characteristics obtained when the voltage waveform shown in FIG. 15A is applied.
Figure 15C:
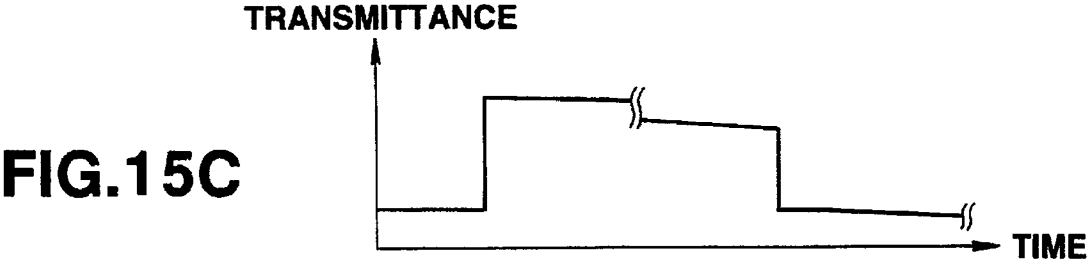
Figure 15D:
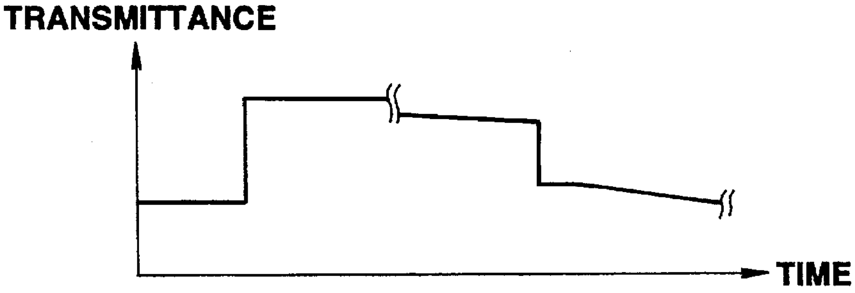

Even if a voltage is simply applied to each of the first and second antiferroelectric liquid crystals, the display gradation levels are not determined uniquely by the applied voltages. For example, when a voltage VP (FIG. 15A) used to drive (ON/OFF drive) the antiferroelectric liquid crystal display device is increased, the transmittance changes in an order of states shown in FIGS. 15B, 15C, and 15D. As shown in FIGS. 15C and 15D, the optical state changes with an increase in the voltage VP to cause flickering. In addition, a continuous change in the transmitted light cannot be obtained with respect to the applied voltages.

In this embodiment, gradation display of the liquid crystal display devices using antiferroelectric liquid crystals having the electrooptic characteristics, such as the first and second antiferroelectric liquid crystals, is achieved in accordance with the first and second methods to be described below.

The first driving method of the antiferroelectric liquid crystal display device having the above arrangement will be described with reference to FIGS. 16A to 17H.

FIGS. 16A to 16D show the waveforms of voltages applied to pixel electrodes 3 of the first to eighth rows of the antiferroelectric liquid crystal display device of this embodiment, and the waveforms of voltages held in the capacitances of the respective pixels. FIGS. 17A to 17H show the voltage waveforms of signals applied to gate lines 5 of the first to 16th rows and each data line 6.

According to this driving method, a selection period (i.e., a period during which the gate pulse is kept applied to the corresponding gate line 5) of each pixel (or pixel electrode) of each row is constituted by the first half selection period and the second half selection period. The first half selection period has the same timing for a plurality (eight) of rows, and the second half selection period has different timings for the respective rows.

During the first half selection period, an initializing pulse P1 for setting the antiferroelectric liquid crystal 11 in the first or second ferroelectric phase is supplied to the antiferroelectric liquid crystal 11. During the second half selection period, a write pulse P2 is applied to the antiferroelectric liquid crystal 11.

As shown in FIGS. 17A to 17D, a row driver 21 simultaneously supplies the gate pulses to the gate lines 5 of the first to eighth rows during the first half selection periods of the pixels of the first to eighth rows to simultaneously turn on TFTs of the first to eighth rows. Meanwhile, a column driver 22 supplies a positive initializing pulse P1 to each data line 6, as shown in FIG. 17H. For this reason, the initializing pulse P1 indicated by solid lines in FIGS. 16A to 16D is supplied to the pixel electrodes of the first to eighth rows.

A voltage value VR of the initializing pulse P1 is set to a value for aligning most of the long axes of the liquid crystal molecules in the first direction 11A, so that all the pixels of the first to eighth rows are set in a white (transmission) state.

The polarity and voltage value of the initializing pulse P1 are determined with respect to those of the reference voltage V0 of the data signal. This reference voltage V0 is equal to the voltage applied to a counter electrode 7.

The pulse width of the gate pulse supplied to the gate line 5 is smaller than that of the data signal supplied to the data line 6 for the purpose of turning off the TFT 4 before the change in data signal to accurately hold the voltage level of the data signal in the capacitance (i.e., the capacitance between the pixel and counter electrodes 3 and 7 which interpose the antiferroelectric liquid crystal 11 therebetween). For the illustrative convenience, the difference between the pulses widths of the gate pulse and the data signal is emphasized in FIGS. 17A to 17H.

When the gate pulses shown in FIGS. 17A to 17D are turned off, the TFTs 4 of the first to eighth rows are turned off accordingly. Therefore, the capacitance of each of the pixels of the first to eighth rows holds a voltage almost equal to the voltage VR of the initializing pulse P1, as indicated by broken lines in FIGS. 16A to 16D, and each pixel maintains the white state until the second half selection period.

When the second half selection period of the pixels of the first row is started, the row driver 21 supplies gate pulses to the gate lines 5 of the first row to turn on the TFTs 4 connected to the gate lines 5 of the first row. Meanwhile, the column driver 22 supplies a write pulse P2 having a voltage (write voltage) VD corresponding to a display gradation level of the pixels of the first row. In this embodiment, the minimum value of the write voltage VD is defined as the voltage V0, and a maximum value Vmax is set to have a voltage level slightly lower than the voltage VR of the initializing pulse P1. The write voltage VD is controlled within the range of V0 to Vmax in accordance with the display gradation levels.

While the write pulse P2 is kept applied to the data line 6, the row driver 21 disables the gate pulses to turn off the TFTs 4 of the first row. For this reason, a voltage supplied from each data line 6 to a corresponding one of the pixel electrodes 3 of the first row through the corresponding TFT 4 is indicated by a solid line in FIG. 16A. The capacitance of each of the pixels of the first row holds a voltage applied upon turn-OFF operation of the corresponding TFT 4 of the first row, i.e., a voltage almost equal to the write voltage VD of the write pulse P2, as indicated by the broken line in FIG. 16A. The pixel maintains the gradation level corresponding to the write voltage VD until the first half selection period of the next frame.

Figures 16A, 16B, 16C, 16D:
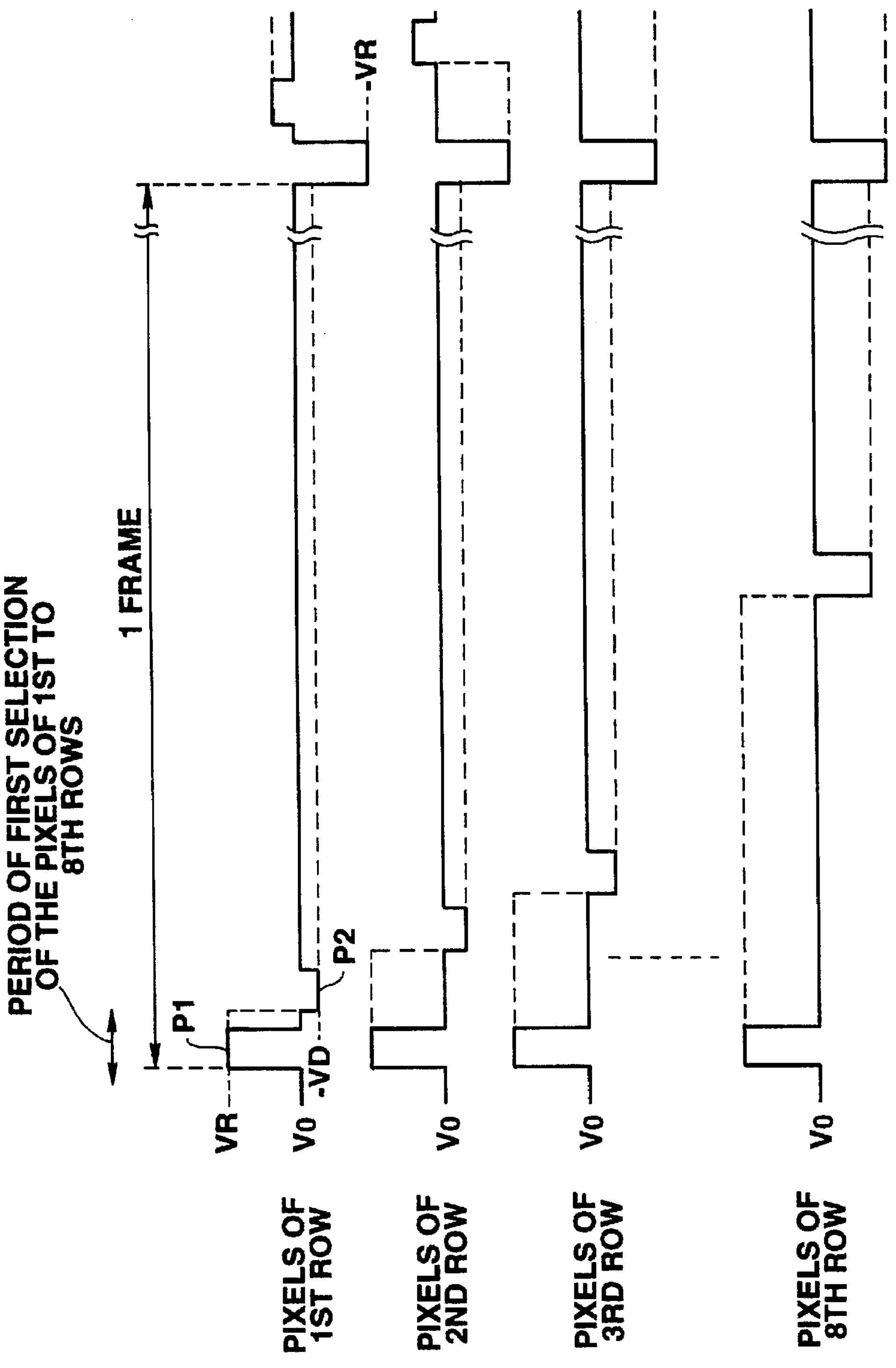
FIGS. 16A to 16D are timing charts showing the waveforms of voltages applied to the first to eighth rows of the liquid crystal display device and the waveform of a voltage held by a pixel capacitance according to the first driving method of the third embodiment.
Figures 17A, 17B, 17C, 17D, 17E, 17F, 17G, 17H:
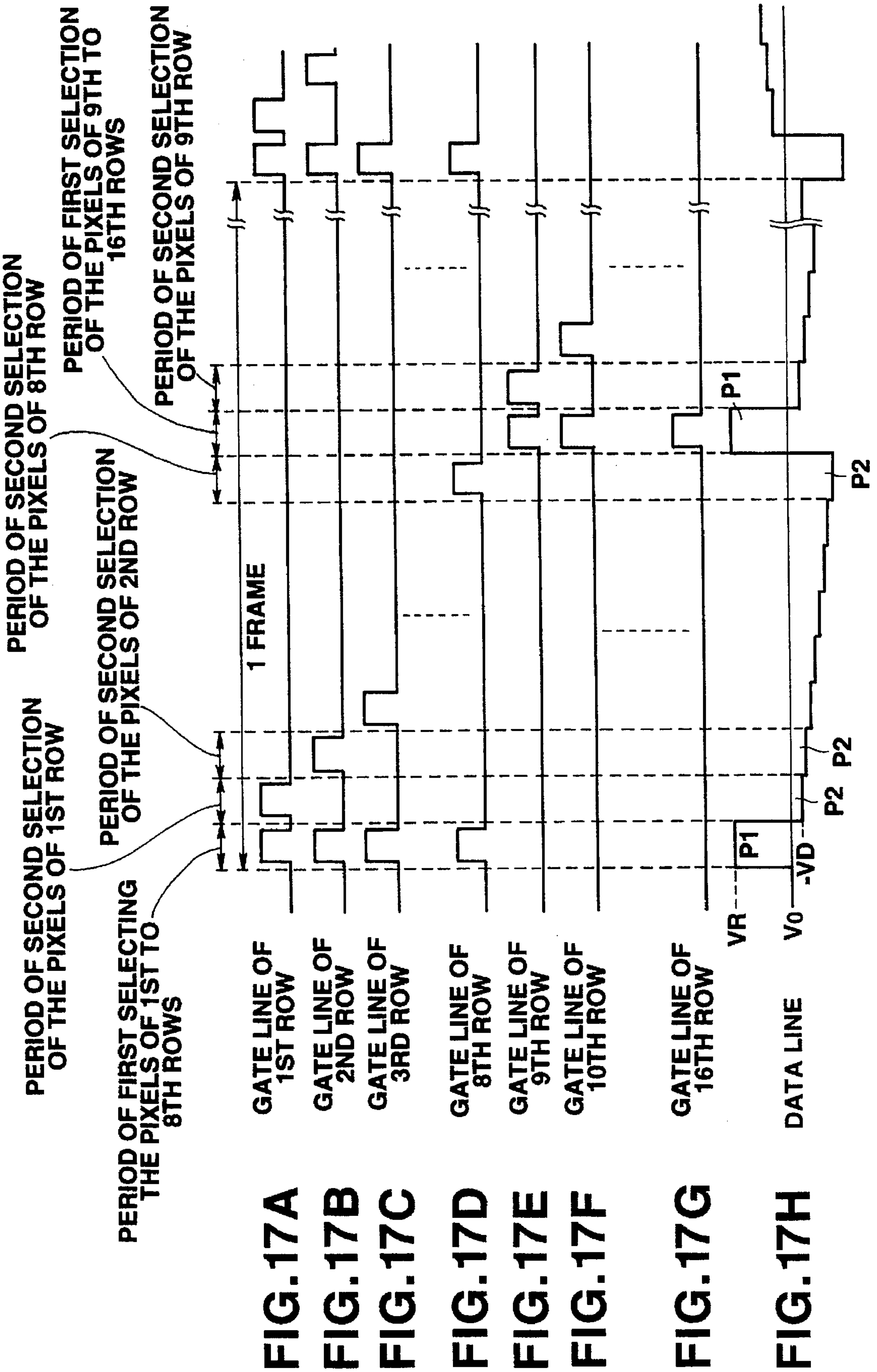
FIGS. 17A to 17G are timing charts showing the waveforms of voltages applied to the gate lines of the first to 16th rows according to the first driving method.
FIG. 17H is a timing chart showing the waveform of a voltage applied to a data line.

In the second half selection period of the pixels of the second row, the third row, . . . , the eighth row, as shown in FIGS. 16B to 16D, the row driver 21 sequentially supplies the gate pulses to the gate lines 5 of the second row, the third row, . . . , the eighth row. Meanwhile, the column driver 22 supplies the write pulse P2 having the write voltage VD corresponding to the display data to each data line 6, as shown in FIG. 17H. As a result, the write pulses indicated by the solid lines in FIGS. 16B to 16D are supplied from the corresponding data lines to the pixel electrodes 3 of the second to eighth rows through the corresponding TFTs 4. The capacitance of each of the pixels of the second to eighth rows holds a voltage almost equal to the write voltage VD. Therefore, each pixel maintains the gradation level corresponding to the display data until the next first half selection period of the gate lines of the first to eighth rows.

In the first half selection period of the pixels of the ninth to 16th rows, the row driver 21 simultaneously supplies the gate pulses to the gate lines 5 of the ninth to 16th rows, as shown in FIGS. 17E to 17G. Meanwhile, the column driver 22 supplies the initializing pulse P1 to each data line 6. Subsequently, in the second half selection period of the pixels of the ninth to 16th rows, the row driver 21 sequentially supplies the gate pulses to the gate lines 5 of the ninth row, the 10th row, . . . , the 16th row, as shown in FIGS. 17E to 17G, and the column driver 22 supplies the write pulse P2 to each data line 6, as shown in FIG. 17H. As a result, the pixels of the ninth to 16th rows maintain the gradation level corresponding to the display data until the next first half selection period.

The above operations are repeated every eight rows. When write access to the pixels of all the rows is completed, a one-frame write operation is completed. When the next frame is started, the above operations are repeated again from the pixels of the first row.

As can be apparent from FIGS. 16A to 16D and 17H, the initializing and write pulses have polarities opposite to those supplied to the previous frame, respectively. A voltage value −VR of the initializing pulse P1 is a value sufficiently smaller than the voltage value for aligning most of the long axes of the liquid crystal molecules in the second direction 11B.

Figure 18A:
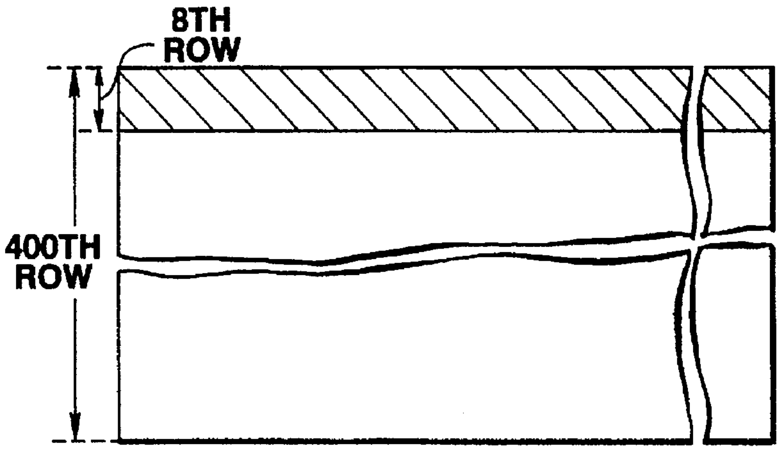
Figure 18B:
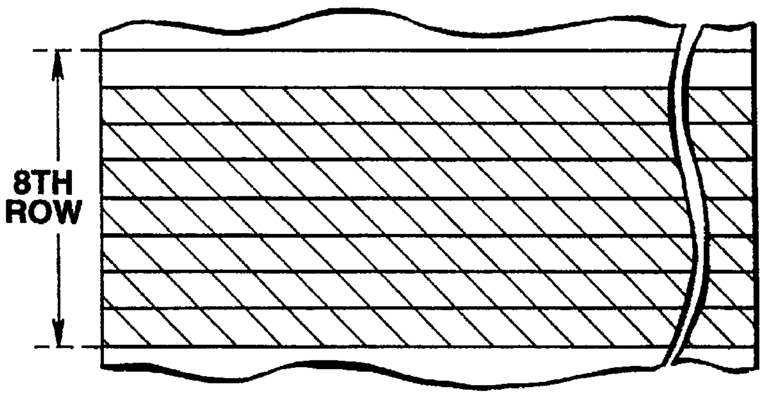
Figure 18C:
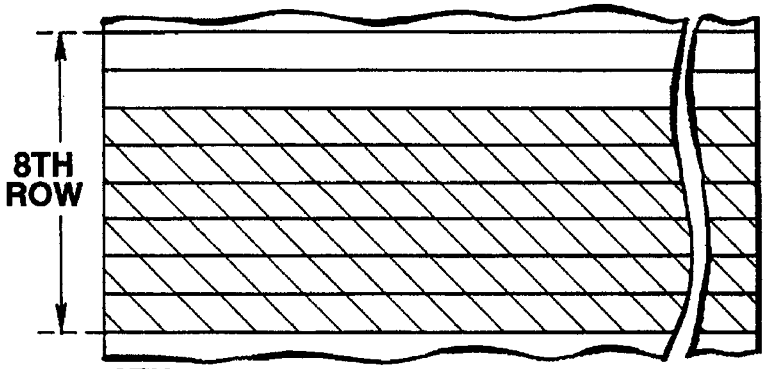
Figure 18D:
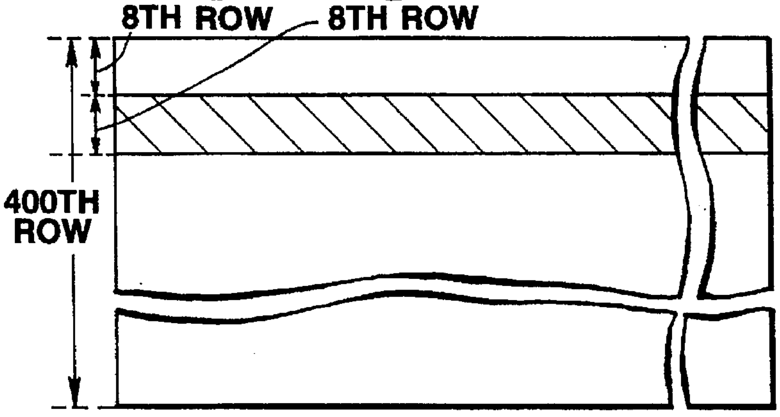
Figures 19A, 19B, 19C, 19D:
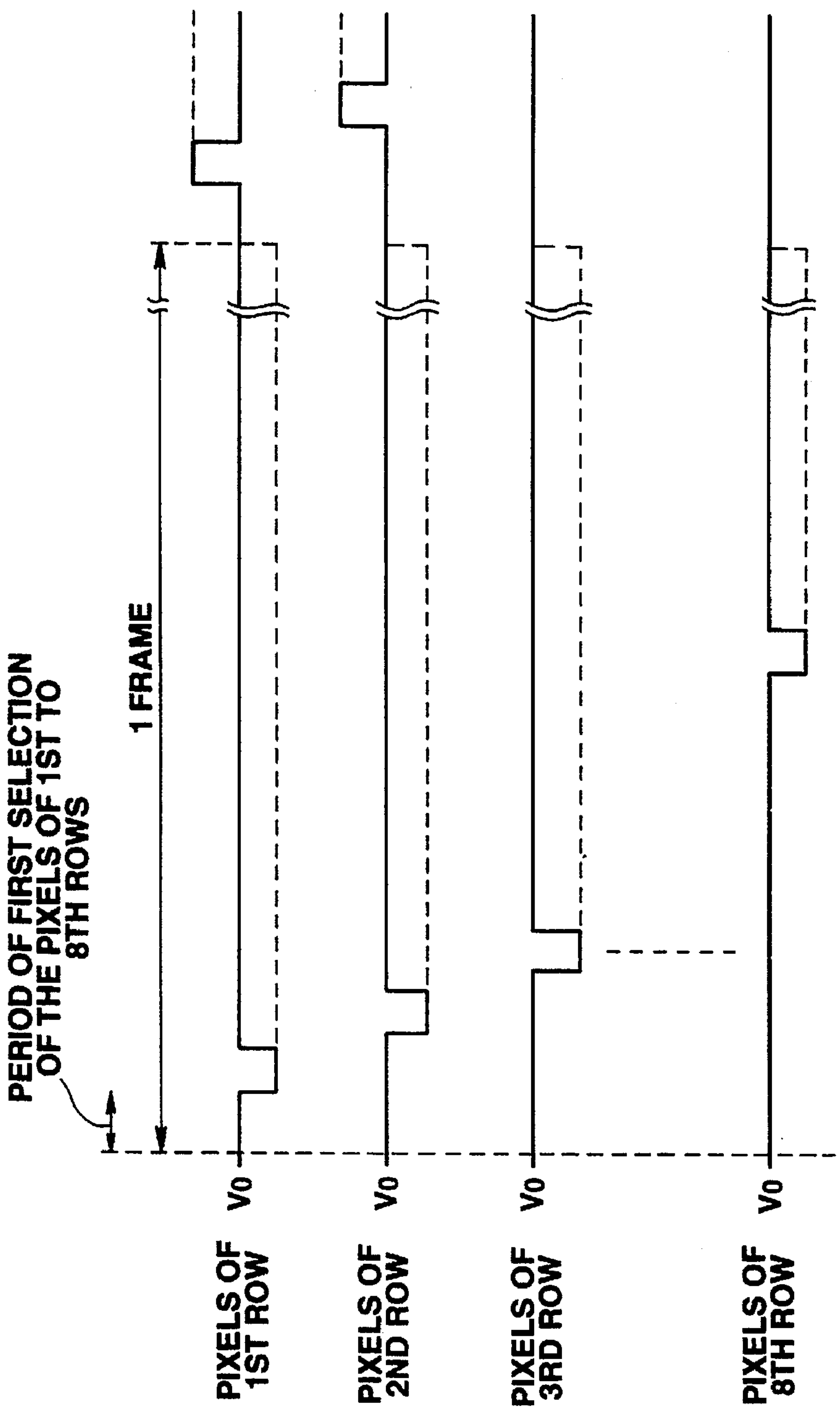
FIGS. 19A to 19D are timing charts showing the waveforms of voltages applied to the pixels of the first to eighth rows of the liquid crystal display device and the waveform of a voltage held by a pixel capacitance according to the second driving method of the third embodiment.

The overall flow of the write operations described above is shown in FIGS. 18A to 18D. Note that FIGS. 18A and 18D show the contents of one frame in this liquid crystal display apparatus and FIGS. 18B and 18C show the contents of eight rows of one frame.

A pair of initializing pulses are supplied to the pixels of the first to eighth rows. As indicated by a hatched portion in FIG. 18A, all the pixels of the first to eighth rows are set in the white (transmission) state (the first half selection period of the pixels of the first to eighth rows). The write pulse P2 is then supplied to the pixels of the first row. As shown in FIG. 18B, the pixels of the first row are set at a gradation level corresponding to the display data (the second half selection period of the pixels of the first row).

The write pulse P2 is then supplied to the pixels of the second row. As shown in FIG. 18C, the pixels of the first and second rows are set at gradation levels corresponding to the display data (the second half selection period of the gate lines of the second row).

Similar operations are repeated until the pixels of the eighth row, and the pixels of the first to eighth rows are set at gradation levels corresponding to the display data.

A pair of initializing pulses are then supplied to the pixels of the ninth to 15th rows. As indicated by a hatched portion in FIG. 18D, all the pixels of the ninth to 15th rows are set in the white state (the first half selection period of the gate lines of the ninth to 15th rows). The write pulses P2 are sequentially supplied to the pixel electrodes 3 of the ninth to 15th rows. As shown in FIGS. 18B and 18C, the pixels of each row are set at a gradation level corresponding to the display data.

When write access of the display data for one frame is completed, the initializing pulse P1 is supplied to the pixels of the first to eighth rows, as shown in FIG. 18A.

In this embodiment, the initializing pulse has a voltage for inducing a ferroelectric phase of the antiferroelectric liquid crystal 11. However, the initializing pulse may have a voltage capable of inducing an antiferroelectric phase of the antiferroelectric liquid crystal 11.

The second driving method of applying the voltage capable of inducing an antiferroelectric phase of the antiferroelectric liquid crystal 11 will be described with reference to FIGS. 19A to 19D and 20A to 20H.

Figures 20A, 20B, 20C, 20D, 20E, 20F, 20G, 20H:
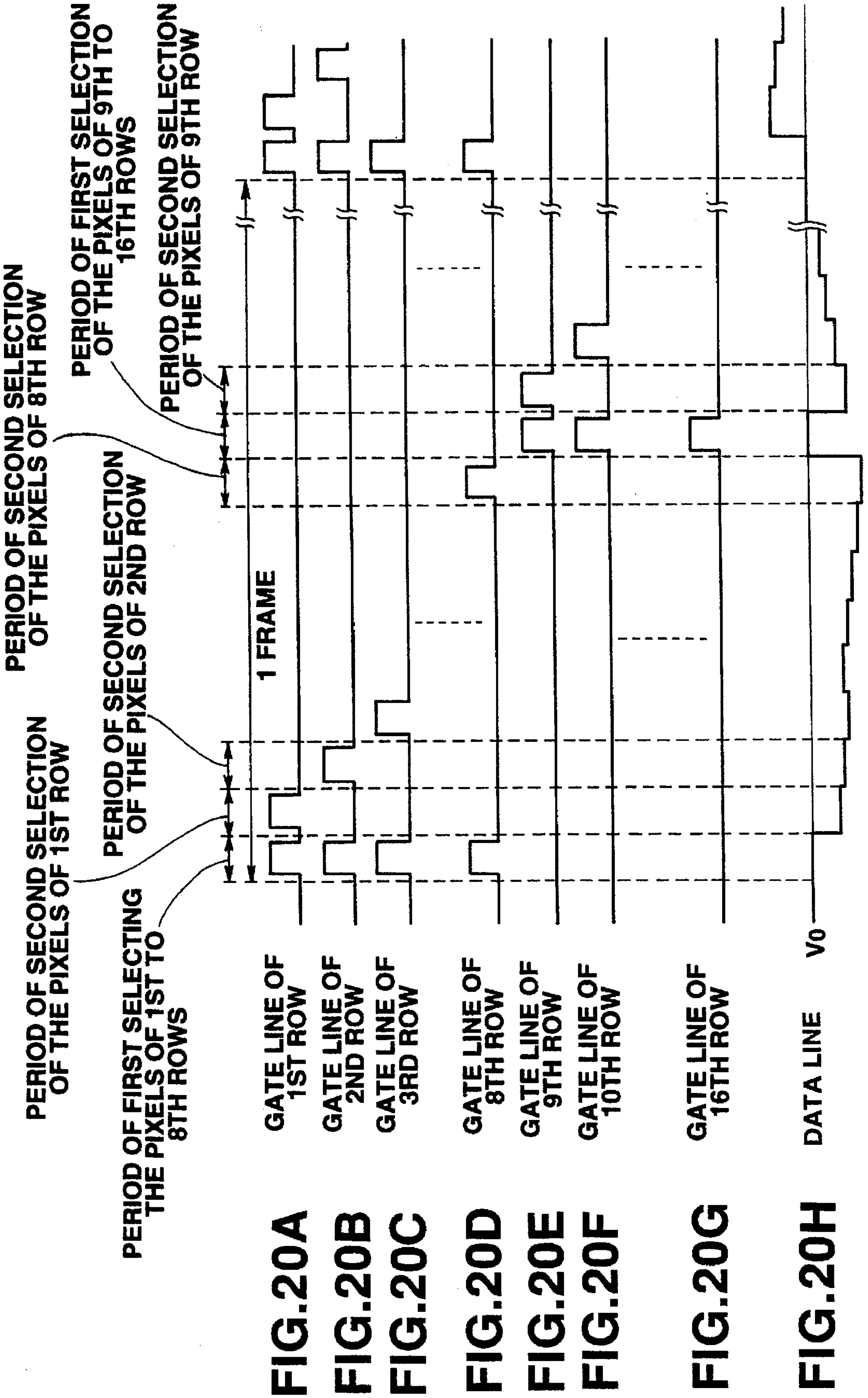
FIGS. 20A to 20G are timing charts showing the waveforms of voltages applied to the gate lines of the first to 16th rows according to the second driving method.
FIG. 20H is a timing chart showing the waveform of a voltage applied to a data line.

As shown in FIGS. 19A to 19D, the row driver 21 simultaneously supplies the gate pulses to the gate lines 5 of the first to eighth rows during the first half selection period of the pixels of the first to eighth rows. The column driver 22 supplies the voltage V0 (the voltage applied to the counter electrode 7) to all the data lines 6, as shown in FIG. 20H. For this reason, the voltage V0 is applied to the pixel electrodes 3 of the first to eighth rows, as shown in FIGS. 19A to 19D. Upon application of the voltage V0, the antiferroelectric liquid crystal 11 exhibits the antiferroelectric phase, and the pixels of the first to eighth rows are set in a dark (nontransmission) state (the transmittance of the antiferroelectric liquid crystal having the electrooptic characteristics in FIG. 14A does not have a minimum value, but has a small value).

When the gate pulses are then disabled, as shown in FIGS. 20A to 20D, each of the capacitances of the pixels of the first to eighth rows holds a voltage almost equal to the voltage V0, as shown in 19A, 19B, 19C, or 19D. Each pixel maintains the dark state until the second half selection period.

The second half selection periods of the pixels of the first to eighth rows are sequentially started, and the row driver 21 sequentially supplies the gate pulses to the gate lines 5 of the respective rows, as shown in FIGS. 20A to 20D. The column driver 22 supplies the write pulse to each data line 6, as shown in FIG. 20H.

As a result, voltages having the waveforms indicated by solid lines in FIGS. 19A to 19D are applied between the counter electrode 7 and the pixel electrodes 3 of the first to eighth rows. The capacitance of each pixel of each row maintains the voltage indicated by a broken line until the first half selection period of the next frame.

The above operations are repeated every eight rows. When write access to the pixels of all the rows is completed, a one-frame write operation is completed. When the next frame is started, the above operations are repeated again from the pixels of the first row. Note that the voltage of the write pulse has a polarity opposite to that of the write pulse supplied to the previous frame.

According to the first and second driving methods, the antiferroelectric liquid crystal 11 having a wide phase transition precursor drive phenomenon is used. The antiferroelectric liquid crystal is set in the ferroelectric or antiferroelectric phase during the first half selection period, and then a write voltage corresponding to a display gradation level is applied during the second half selection period. For this reason, the antiferroelectric liquid crystal 11 can be set uniquely in a desired intermediate optical state. Therefore, an arbitrary transmittance can be obtained almost uniquely. Therefore, gradation display can be performed.

Figure 21:
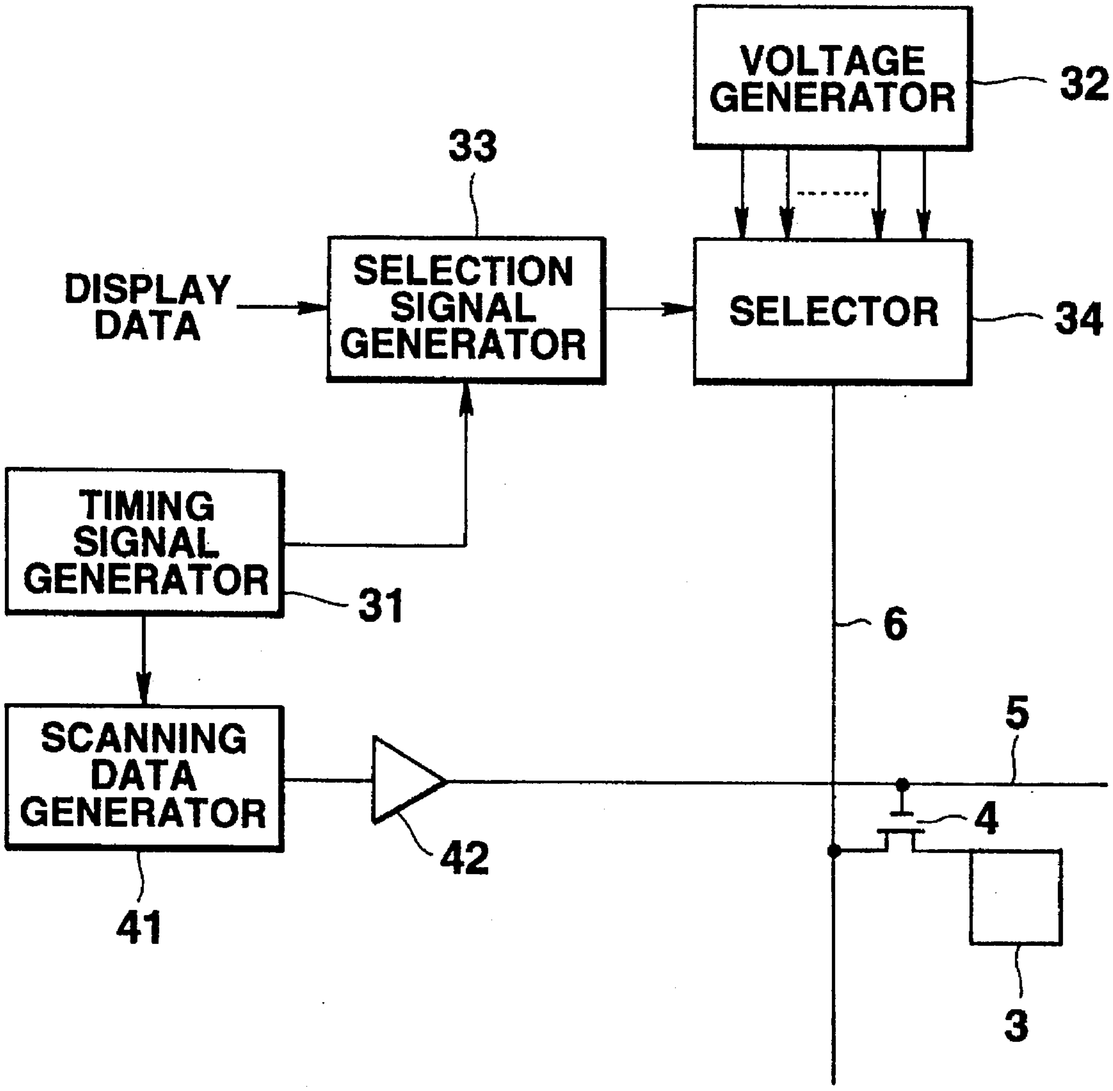
FIG. 21 is a diagram showing an arrangement of row and column drivers.
Figure 22:
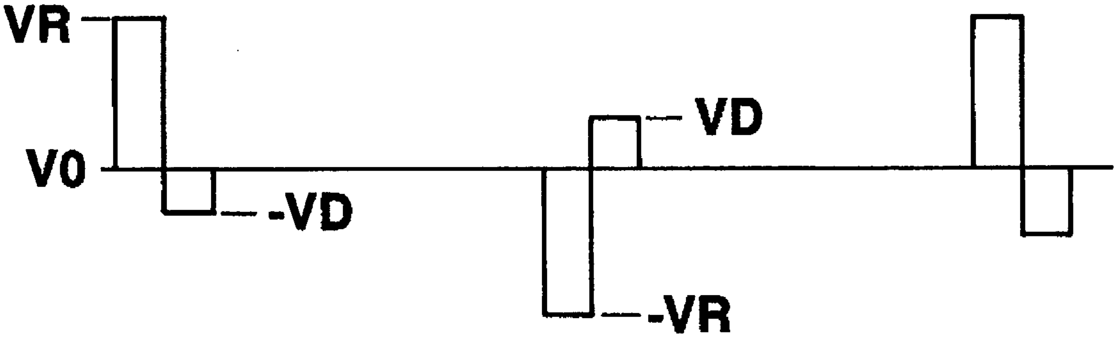
FIG. 22 is a waveform chart showing the waveform of a voltage applied to the first antiferroelectric liquid crystal to obtain the characteristics shown in FIG. 13B.

An arrangement of the row and column drivers 21 and 22, which can perform the above driving method, will be described with reference to FIG. 21.

The column driver 22 comprises, for example, a timing signal generator 31, a voltage generator 32, a selection signal generator 33, and a selector 34. For example, the selection signal generator 33 and the selector 34 are arranged for each data line 6. The timing signal generator 31 and the voltage generator 32 are commonly arranged for the plurality of data lines 6.

The timing signal generator 31 generates a timing signal for controlling operation timings. The voltage generator 32 generates a plurality of voltages applied to the data lines 6.

The selection signal generator 33 receives the above timing signal and display data in units of pixels. Assuming that the display data of the pixels of the first row, the second row, . . . , are defined as X1, X2, . . . , X8, X9, . . . , the selection signal generator 33 inserts data XR or −XR corresponding to the voltage VR of the initializing pulse or the voltage V0 every eight pixels in accordance with the timing signal, thereby generating selection data XR, −X1, −X2, . . . , −X8, XR, −X9, . . . In the next frame, the selection signal generator 33 inverts the sign of the data to generate selection data −XR, X1, X2, . . . , X8, −XR, X9, . . . The selector 34 selects one of the voltages supplied from the voltage generator 32 so as to correspond to the selection data and sends the selected data to the data line 6.

The row driver 21 comprises a scanning (address) data generator 41 and a driver 42 for applying a voltage corresponding to the output data from the scanning data generator 41 to the gate line 5. Each scanning data generator 41 generates a data string corresponding to the gate pulses in accordance with the clock signals supplied from the timing signal generator 33 and supplies the resultant data string to the driver 42.

Gradation control of the liquid crystal display device using the first antiferroelectric liquid crystal having the electrooptic characteristics shown in FIG. 13A was performed in accordance with a driving method of supplying the initializing pulse having the voltage VR or −VR to the pixel electrodes and then a write pulse having the voltage VD. In this driving method, the pulse width of each pulse was set to 120 μs, VR=20V, and $0 \leqq VD \leqq 18V$. As a result, clear gradation display could be performed.

Figure 13B:
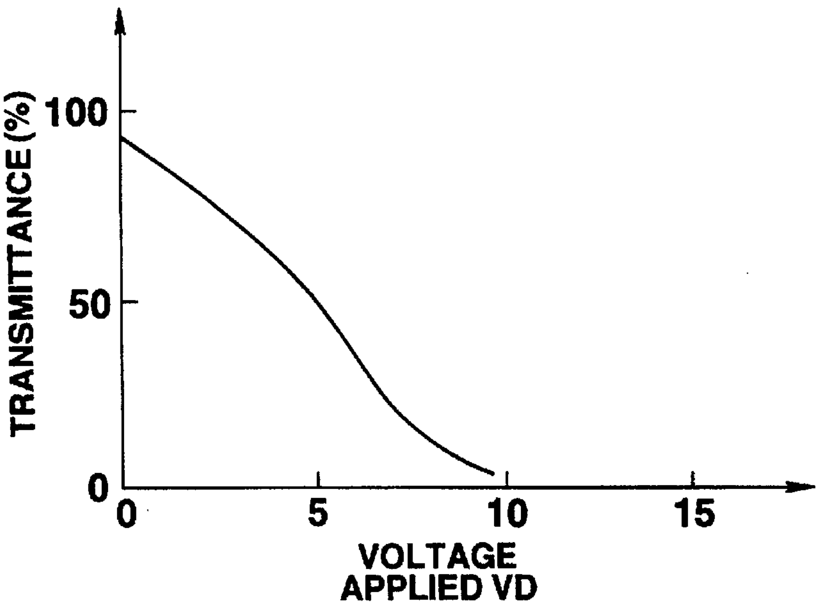
FIG. 13B is a graph showing changes in transmittance as a function of a voltage VD applied to the liquid crystal display device using the first antiferroelectric liquid crystal when a voltage waveform shown in FIG. 21 is used to drive the element.

The liquid crystal display device was driven under the same condition except that the transmission axes of a pair of polarizing plates 13 and 14 were set parallel to each other and a retardation $\Delta n \cdot d$ (where $\Delta n$ is the birefringence and d is the thickness of a liquid crystal phase) in the ferroelectric phase was set to an integer multiple of the wavelength of incident light (therefore, when the first antiferroelectric liquid crystal exhibits the ferroelectric phase, the display becomes dark; and when the first antiferroelectric liquid crystal exhibits the antiferroelectric phase, the display becomes bright). The results are shown in FIG. 13B. In this case, clear gradation display could also be performed.

Figure 14B:
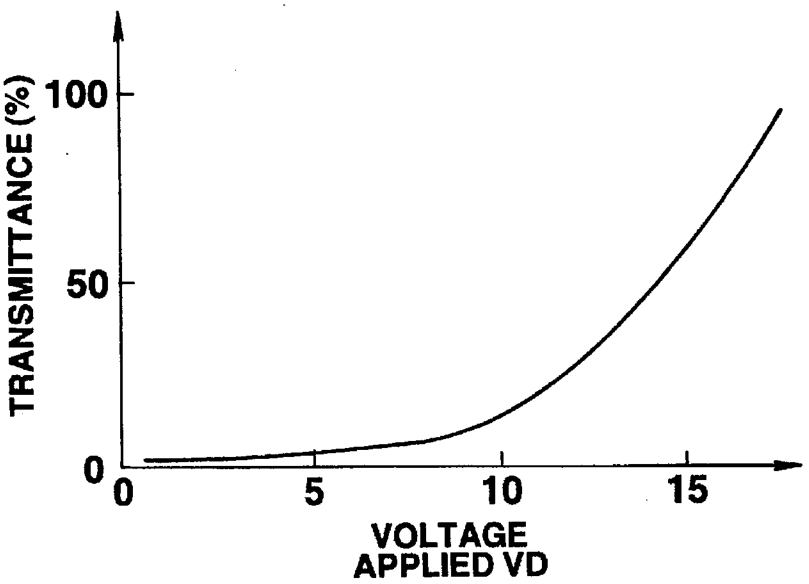
FIG. 14B is a graph showing changes in transmittance as a function of a voltage VD applied to the liquid crystal display device using the second antiferroelectric liquid crystal when a voltage waveform shown in FIG. 22 is used to drive the element.
Figure 23:
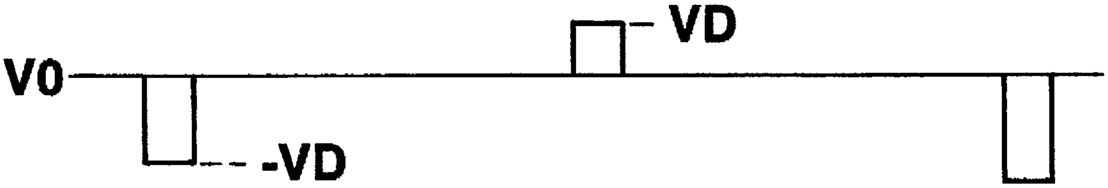
FIG. 23 is a waveform chart showing the waveform of a voltage applied to the second antiferroelectric liquid crystal to obtain the characteristics shown in FIG. 14B.

Gradation control of a liquid crystal display device using the second antiferroelectric liquid crystal having the electrooptic characteristics shown in FIG. 14A was performed by a driving method of applying the voltage V0 to the pixel electrodes and then a write pulse having the voltage VD, as shown in FIG. 23. According to this driving method, the pulse width of each pulse was 120 μs, and $0 \leqq VD \leqq 18V$. The results are shown in FIG. 14B. In this case, clear gradation display could also be performed.

The above description have been concentrated mainly on clear gradation display using the first and second antiferroelectric liquid crystals having the electrooptic characteristics shown in FIGS. 13A and 13B. The first and second driving methods, however, are also applicable to an antiferroelectric liquid crystal exhibiting a relatively wide phase transition precursor phenomenon. Therefore, the antiferroelectric liquid crystal display device of the second embodiment may be driven by the first or second driving method.

In the above embodiment, the first half selection periods of the eight rows have the same timing. However, the number of rows is not limited to eight, but can be two or more.

The first half selection periods of a plurality of rows need not have the common timings, but may be different timings. In this case, the selection period of one row is divided into the first and second half selection periods. The initializing pulse is supplied to the data line 6 during the first half selection period, and the write pulse is supplied to the data line 6 during the second half selection period.

When the number of rows having the common first half selection period is excessively large, the time from the first half selection period to the second half selection period of the last row is excessively prolonged to cause flickering of the display screen. However, when the number of rows having the common timing is excessively small, the operation becomes equivalent to a case wherein the first selection period is set for each row. In this case, the write time of one frame is undesirably prolonged. If the number of rows, i.e., gate lines 5 is experimentally about 200 to 400, the number of rows having the common first half selection period falls within the range of 6 to 10, and preferably 8 and 10.

The voltages VR and −VR of the initializing pulses P1 have voltages (absolute values) enough to align most of the long axes (directors) of the liquid crystal molecules of the antiferroelectric liquid crystal 11 in the first or second direction 11A or 11B and need not be voltages for perfectly aligning the directors in the aligning direction 11A or 11B.

In the above embodiment, the polarities of the initializing and write pulses are kept unchanged within one frame, but may change within one frame.

This embodiment is also applicable to an antiferroelectric liquid crystal display device having a pair of polarizing plates arranged such that the liquid crystals aligned in the first and second ferroelectric phases provide a dark display, and the liquid crystals aligned in the antiferroelectric phase provide a bright display.

The driving methods of this embodiment are not limited to the antiferroelectric liquid crystal display device having TFTs as active elements, but are applicable to an antiferroelectric liquid crystal display device using MIMs as active elements.

As described above, according to the liquid crystal display apparatus and the driving method of the liquid crystal display devices of this embodiment, clear gradation display can be performed in the antiferroelectric liquid crystal display device of an active matrix scheme using an antiferroelectric liquid crystal. In addition, a plurality of rows can have the a common first half selection period, and therefore, the write time of one field can be shortened.

FOURTH EMBODIMENT

In the first to third embodiments, the liquid crystal display devices are of an active matrix type. However, the present invention is also applicable to an antiferroelectric liquid crystal display device of a simple matrix type.

The fourth embodiment exemplifying an antiferroelectric liquid crystal display device of a simple matrix type to perform gradation display will be described below.

Figure 24:
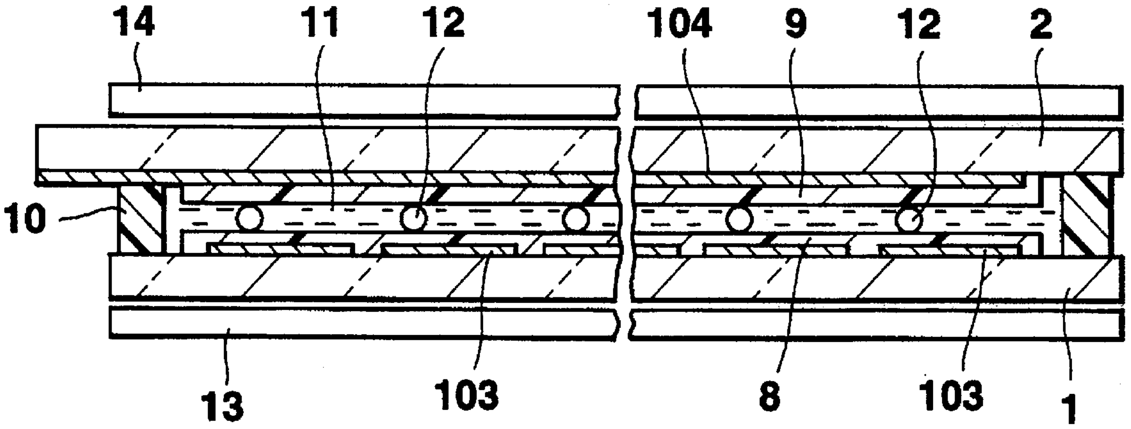
FIG. 24 is a sectional view showing an antiferroelectric liquid crystal display device according to the fourth embodiment of the present invention.

FIG. 24 is a sectional view of the antiferroelectric liquid crystal display device according to this embodiment. The same reference numerals as in FIG. 2 denote the same parts in FIG. 24.

A plurality of transparent parallel scanning electrodes 104 are formed on an upper-side substrate (to be referred to as an upper substrate hereinafter) 2 constituting a pair with a transparent substrate 1. A plurality of transparent signal electrodes 103 are formed on the lower-side substrate (to be referred to as a lower substrate hereinafter) 1 in a direction perpendicular to the scanning electrodes 104. The scanning electrodes 104 are connected to a row driver 21, and the signal electrodes 103 are connected to a column driver 22.

Aligning films 8 and 9 are formed on the electrode formation surfaces of the lower and upper substrates 1 and 2, respectively. The aligning films 8 and 9 are horizontal aligning films consisting of an organic polymer compound such as polyimide. An aligning treatment by means of rubbing is performed on the opposing surfaces of the aligning films 8 and 9.

The lower and upper substrates 1 and 2 are adhered to each other at their edges through a frame-like seal member 10. An antiferroelectric liquid crystal 11 is sealed in a space surrounded by the seal member 10 between the substrates 1 and 2. The antiferroelectric liquid crystal 11 preferably has characteristics shown in FIG. 1, i.e., a high memory function level.

A pair of polarizing plates are arranged on the upper and lower surface sides of the liquid crystal element. The transmission axes of these polarizing plates 13 and 14 are set, as shown in FIG. 4.

A conventional driving method will be described to compare the conventional driving method with a driving method of this embodiment.

Figures 25A, 25B, 25C, 25D:
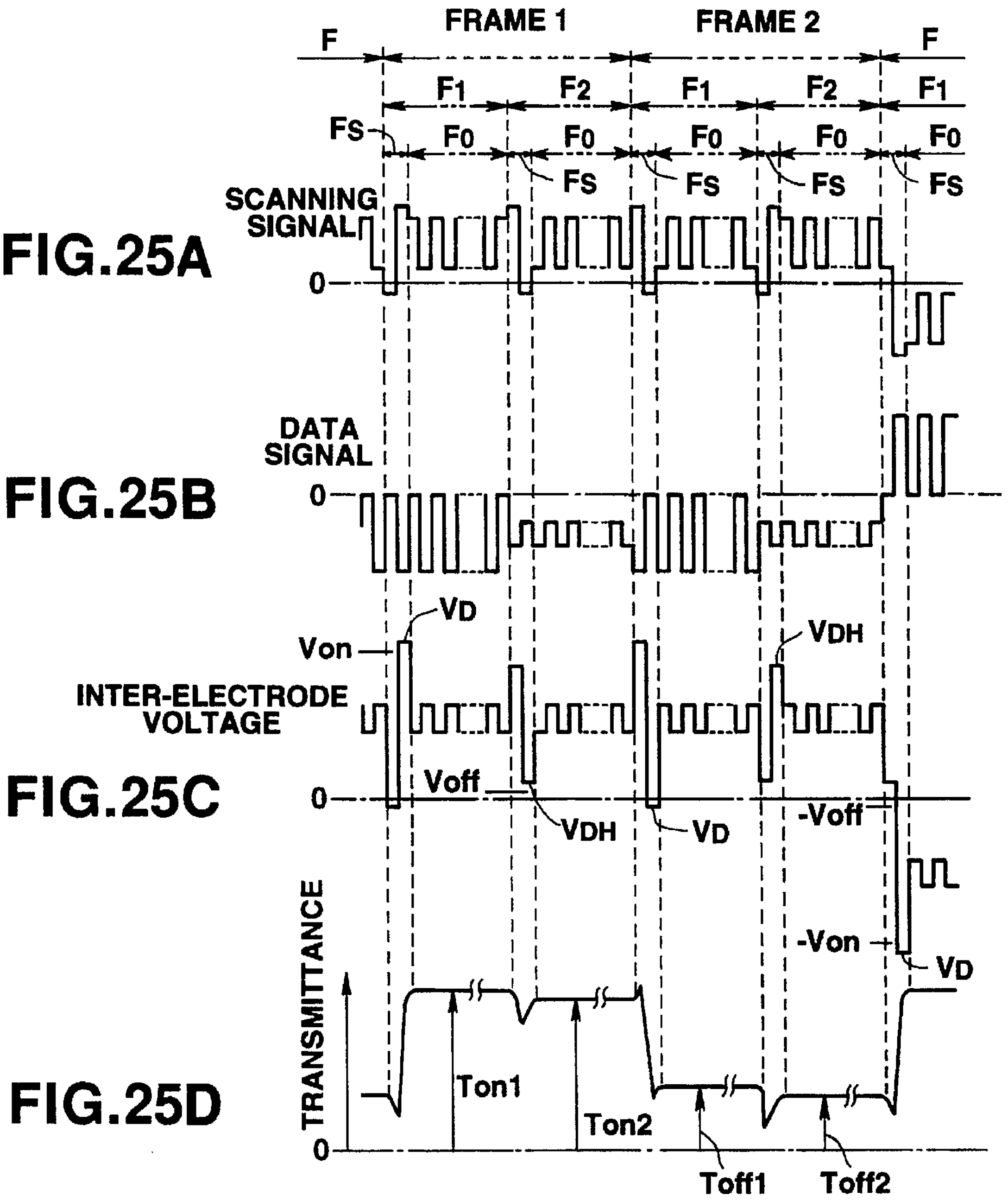
FIG. 25A is a timing chart showing a conventional scanning signal.
FIG. 25B is a timing chart showing a conventional data signal.
FIG. 25C is a timing chart showing a conventional voltage applied to the liquid crystal.
FIG. 25D is a timing chart showing the transmittance of the liquid crystal display device when the voltage shown in FIG. 25C is applied thereto.

FIG. 25A shows a voltage applied to the scanning electrodes 104 of the first row, FIG. 25B shows the waveform of a data signal supplied to a given signal electrode 103, FIG. 25C shows a change in voltage (to be referred to as an electrode voltage hereinafter) applied between the electrodes 103 and 104, and FIG. 24D shows a change in transmittance.

This driving method is called a two-field method in which two fields F1 and F2 constitute one frame F. The first field F1 of each frame is defined as a write field, and the second field F2 is defined as a holding field for holding the write state of the first field F1. Referring to FIGS. 25A to 25D, reference symbol FS denotes a selection period of the scanning electrodes of the first row; F0, a nonselection period thereof.

According to this driving method, scanning and data signals having the waveforms shown in FIGS. 25A and 25B are applied to the scanning and signal electrodes 104 and 103, respectively, so that the electrode voltage is controlled as shown in FIG. 25C, thereby driving the antiferroelectric liquid crystal display device. For example, when a write voltage VD equal to or higher than an ON threshold voltage Von is applied as an electrode voltage during the write period FS of the first field F1 of frame 1, the liquid crystal molecules are aligned in the first or second direction, and the transmittance becomes maximum. The display is set in the bright state. This state is maintained by the memory function of the aligned sate of the antiferroelectric liquid crystal 11.

The electrode voltage applied during the write period FS of the second field F2 of frame 1 is a write state holding voltage VDH lower than the ON threshold voltage Von and higher than an OFF threshold voltage Voff. Therefore, the aligned state of the antiferroelectric liquid crystal 11 hardly changes in the second field F2, and the transmittance is kept as Ton2 almost equal to the transmittance Ton1 of the first field F1.

In the next frame 2, when the write voltage VD equal to or lower than the OFF threshold voltage Voff is applied as the electrode voltage during the write period FS of the first field F1, the antiferroelectric liquid crystal 11 is aligned in the antiferroelectric phase. As shown in FIG. 25C, the transmittance is decreased to set the display in the dark state.

The electrode voltage applied to the write period FS of the second field F2 of frame 2 is the write state holding voltage VDH lower than the ON threshold voltage von and higher than the OFF threshold voltage Voff. Therefore, in the second field F2, the antiferroelectric liquid crystal 11 maintains the antiferroelectric phase.

According to this driving method, however, the transmittance in the dark display state cannot be sufficiently low. For this reason, an image having a high contrast level cannot be displayed because the antiferroelectric liquid crystal 11 has a low response speed when it is shifted from the first or second ferroelectric phase to the antiferroelectric phase, and the selection period TS ends before the antiferroelectric liquid crystal 11 is perfectly aligned in the antiferroelectric phase. When the antiferroelectric liquid crystal 11 is not perfectly aligned in the antiferroelectric phase, linearly polarized light incident on the liquid crystal through one polarizing plate is polarized by the antiferroelectric liquid crystal 11, and a given polarized component emerges through the other polarizing plate 11, thereby producing leakage light. As a result, a high contrast level cannot be obtained.

In addition, according to this method, since the antiferroelectric liquid crystal 11 cannot be perfectly set in the antiferroelectric phase, the aligned state of the antiferroelectric liquid crystal 11 is unstable. When the display is set in the dark state, a difference between the transmittance Toff1 in the field F1 and the transmittance Toff2 in the field F2 is caused to flicker the display.

This problem caused by the above driving method also applies to an antiferroelectric liquid crystal display device in which a pair of polarizing plates are arranged such that the liquid crystal aligned in the first and second ferroelectric phase has the dark state and the liquid crystal aligned in the antiferroelectric phase has the bright state. In this case, the transmittance in the bright display state is decreased to lower the contrast level, and the bright display flickers.

In order to solve the above problem, this embodiment employs a driving method of applying a voltage (to be referred to as a reset voltage hereinafter) for aligning the antiferroelectric liquid crystal in the antiferroelectric phase in the last portion of the nonselection period. This driving method will be described with reference to FIGS. 26A to 26D.

Figures 26A, 26B, 26C, 26D:
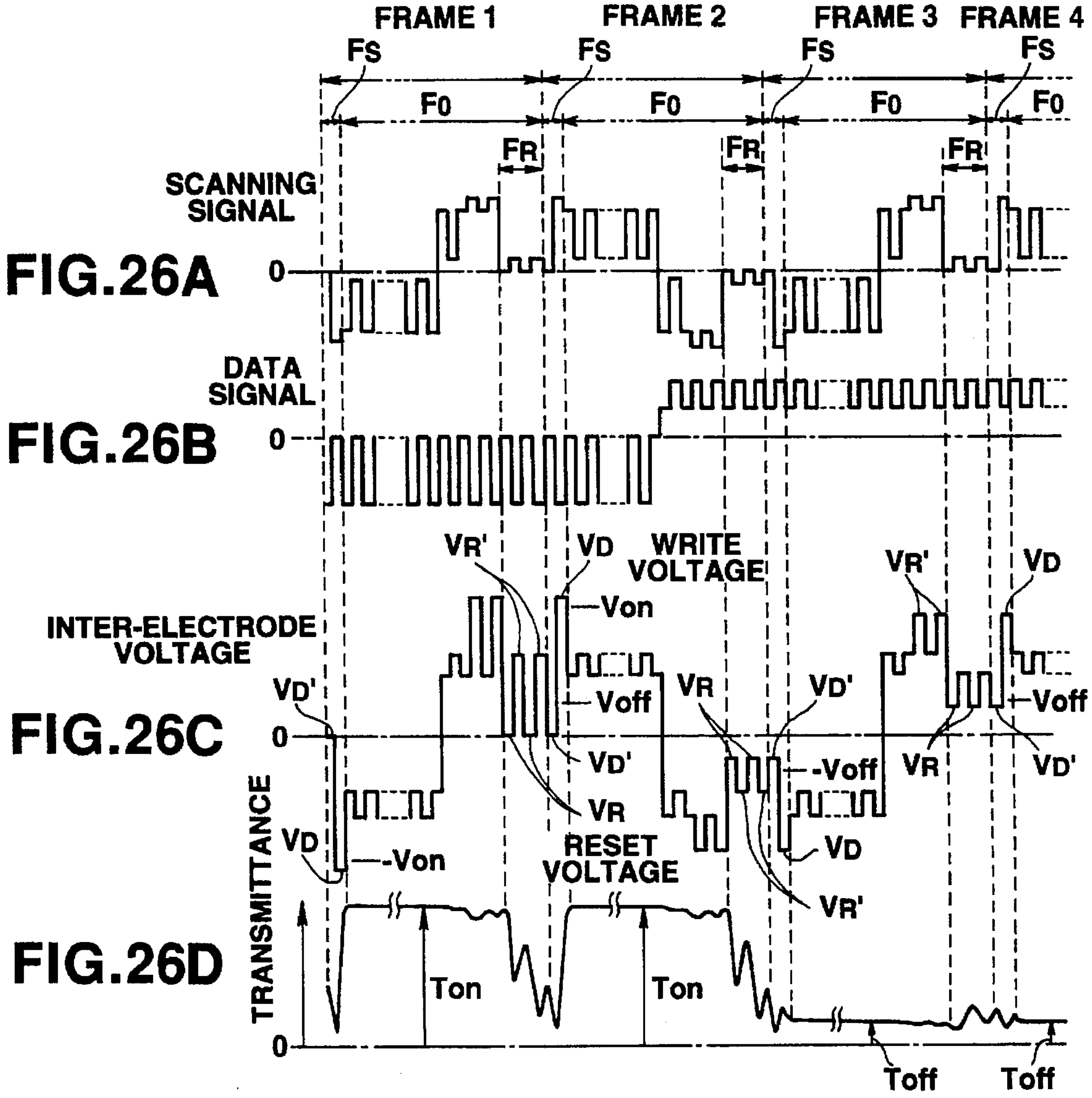
FIG. 26A is a timing chart showing a scanning signal according to the fourth embodiment.
FIG. 26B is a timing chart showing a data signal according to the fourth embodiment.
FIG. 26C is a timing chart showing a voltage applied to the element according to the fourth embodiment.
FIG. 26D is a view showing the transmittance of the liquid crystal display device when the voltage shown in FIG. 26C is applied thereto.

FIG. 26A shows a voltage applied to the scanning electrodes 104 of the first row, FIG. 26B shows the waveform of a data signal applied to one signal electrode, FIG. 26C shows a change in electrode voltage, and FIG. 26D shows a change in transmittance. According to this driving method, one field is defined as one frame. Referring to FIGS. 26A to 26D, reference symbol FS denotes a selection period; FO, a nonselection period; and FR, a reset period assured in the last portion of the nonselection period FO. FIGS. 26A to 26C show the states controlled in an order of bright, dark, and dark states.

According to this method, the scanning signal (FIG. 26A) and the data signal (FIG. 26B) are applied to the scanning and signal electrodes 104 and 103, respectively, to control the electrode voltage in the manner shown in FIG. 26C, thereby driving the antiferroelectric liquid crystal display device. An electrode voltage, i.e., the reset voltage VR equal to or lower than the OFF threshold voltage Voff and equal to or higher than the OFF threshold voltage −Voff, for aligning the antiferroelectric liquid crystal 11 in the antiferroelectric phase is applied during the reset period FR as the last period of the nonselection period F0 of each frame.

One frame F is about 10 ms, and the width of one pulse of each of the scanning and data signals is about 20 μs.

According to this driving method, the reset voltage VR and a compensation voltage VR' having a polarity opposite to and the same absolute value as those of the reset voltage VR to constitute a pair are applied to the antiferroelectric liquid crystal 11. A DC voltage component equal to or larger than an allowable value is applied to the antiferroelectric liquid crystal 11 to prevent the charge in the liquid crystal layer from being localized and to prevent a burn-in phenomenon. Due to the same reason as described above, the write voltage VD applied between the electrodes 103 and 104 and a compensation voltage VD' having a polarity opposite to and the same absolute value as those of the write voltage VD to constitute a pair are applied to the antiferroelectric liquid crystal 11 during the selection period FS.

Upon application of the reset voltage VR to the antiferroelectric liquid crystal 11, even if the current aligned state of the antiferroelectric liquid crystal 11 is the first or second ferroelectric phase, the antiferroelectric liquid crystal 11 tends to be aligned to come close to the antiferroelectric phase. In this embodiment, the reset voltage VR is applied to the antiferroelectric liquid crystal 11 twice within one reset period FR. Therefore, the liquid crystal 11 is aligned to come close to the antiferroelectric phase to some extent in response to the first reset voltage VR and then aligned to come closer to the antiferroelectric phase in response to the second reset voltage VR.

If the write voltage VD applied between the electrodes 103 and 104 during the selection period FS of the next frame is the voltage (the voltage equal to or lower than the OFF threshold voltage Voff and equal to or higher than the OFF threshold voltage −Voff) for aligning the antiferroelectric liquid crystal 11 in the antiferroelectric phase, the antiferroelectric liquid crystal 11 can be immediately aligned in the antiferroelectric phase. For this reason, even if the antiferroelectric liquid crystal 11 has a low response speed when it is shifted to the antiferroelectric phase, the antiferroelectric liquid crystal 11 can be aligned in the antiferroelectric phase by the write voltages VD applied between the electrodes 103 and 104 during the selection period FS.

If the write voltage VD applied between the electrodes 103 and 104 during the selection period FS of the next frame is the voltage (i.e., the voltage equal to or higher than von and equal to or lower than −Von) for aligning the antiferroelectric liquid crystal 11 in the antiferroelectric phase, the response speed for aligning the antiferroelectric liquid crystal 11 from the antiferroelectric phase to the ferroelectric phase is high. Therefore, the antiferroelectric liquid crystal 11 can be sufficiently aligned in the first or second ferroelectric phase.

According to this driving method, when the display is to be set in the dark state, the antiferroelectric liquid crystal 11 can be aligned in the antiferroelectric phase to sufficiently decrease the transmittance. Note that the transmittance Ton in the bright display state is always kept almost constant, and the transmittance Toff in the dark display state is always kept almost constant, too. Therefore, fluctuations in display gradation levels can be eliminated.

In this embodiment, the reset voltage VR is applied twice during the reset period. However, the number of times of applying the reset voltage may be once, or three times or more.

This method is also applicable to an antiferroelectric liquid crystal display device having a pair of polarizing plates arranged such that the liquid crystal aligned in the first and second ferroelectric phases provides a dark display, and the liquid crystal aligned in the antiferroelectric phase provides a bright display.

This embodiment exemplifies the driving method using one field as one frame. However, the method may be modified as a two-field method using two fields as one frame. In this case, a reset voltage is applied to the liquid crystal to align the antiferroelectric liquid crystal 11 in the antiferroelectric phase at the last portion of the nonselection period FO of each field.

The present invention is not limited to the first to fourth embodiments described above, and various changes and modifications may be made within the spirit and scope of the invention.

What is claimed is:

1. An antiferroelectric liquid crystal display device of an active matrix type, comprising:

a liquid crystal cell of the active matrix type including one substrate having a plurality of pixel electrodes and a plurality of active elements connected to said pixel electrodes, said pixel electrodes and said active elements being arranged in a matrix form, and the other substrate having a counter electrode opposing said pixel electrodes; and an antiferroelectric liquid crystal sealed in said liquid crystal cell and having first and second ferroelectric phases in which aligned states of liquid crystal molecules have different directions and an antiferroelectric phase exhibiting an intermediate aligned state between the first and second ferroelectric phases, so that a difference between a voltage for changing the first or second ferroelectric phase to the antiferroelectric phase and a voltage for changing the antiferroelectric phase to the first or second ferroelectric phase is not more than 6V, the liquid crystal exhibiting a precursor tilt phenomenon in which the tilt angle of the liquid crystal molecules with respect to the substrate surface changes with a change in applied voltage.

2. A device according to claim 1, wherein the difference between the voltage for changing the first or second ferroelectric phase to the antiferroelectric phase and the voltage for changing the antiferroelectric phase to the first or second ferroelectric phase is not more than 5V.

3. A device according to claim 2, further comprising driving means, connected to said active elements, for applying a voltage for setting said antiferroelectric liquid crystal in the first or second ferroelectric phase or the antiferroelectric phase to said pixel electrode through a corresponding one of said active elements during the selection period, thereby performing an ON/OFF display operation.

4. A device according to claim 1, wherein the difference between the voltage for changing the first or second ferroelectric phase to the antiferroelectric phase and the voltage for changing the antiferroelectric phase to the first or second ferroelectric phase is not more than 3V, and said antiferroelectric liquid crystal has optical characteristics changing along a curve in accordance with the applied voltage.

5. A device according to claim 4, further comprising driving means, connected to said active elements, for applying a voltage corresponding to a display gradation level to said pixel electrode through said corresponding active element during the selection period, thereby performing gradation display.

6. An antiferroelectric liquid crystal display device of an active matrix type, comprising:

a liquid crystal cell of the active matrix type including one substrate having a plurality of pixel electrodes and a plurality of active elements connected to said pixel electrodes, said pixel electrodes and said active elements being arranged in a matrix form, and the other substrate having a counter electrode opposing said pixel electrodes; and an antiferroelectric liquid crystal sealed in said liquid crystal cell, having first and second ferroelectric phases in which aligned states of liquid crystal molecules are different and an antiferroelectric phase, and exhibiting a precursor tilt phenomenon in which the tilt angle of the liquid crystal molecules with respect to the substrate surface changes with a change in applied voltage.

7. An antiferroelectric liquid crystal display device of an active matrix type, comprising:

a liquid crystal cell of the active matrix type including one substrate having a plurality of pixel electrodes and a plurality of active elements connected to said pixel electrodes, said pixel electrodes and said active elements being arranged in a matrix form, and the other substrate having a counter electrode opposing said pixel electrodes; and an antiferroelectric liquid crystal sealed in said liquid crystal cell, having first and second ferroelectric phases in which aligned states of liquid crystal molecules are different and an antiferroelectric phase in accordance with an applied electric field, and exhibiting an antiferroelectric-ferroelectric phase transition precursor phenomenon in which the molecules move in accordance with the electric field for changing the aligned state of said liquid crystal molecules from the antiferroelectric phase to the first and second ferroelectric phases.

8. A device according to claim 7, wherein said antiferroelectric liquid crystal essentially consists of a liquid crystal exhibiting the antiferroelectric phase in an application voltage range of ±0.7V.

9. An antiferroelectric liquid crystal display device of an active matrix type, comprising:

a liquid crystal cell of the active matrix type including one substrate having a plurality of pixel electrodes and a plurality of active elements connected to said pixel electrodes, said pixel electrodes and said active elements being arranged in a matrix form, and the other substrate having a counter electrode opposing said pixel electrodes; and an antiferroelectric liquid crystal sealed in said liquid crystal cell, having first and second ferroelectric phases in which aligned states of liquid crystal molecules are different and an antiferroelectric phase in accordance with an applied electric field, and exhibiting an antiferroelectric-ferroelectric phase transition precursor phenomenon in which the molecules move in accordance with the electric field for changing the aligned state of said liquid crystal molecules from the antiferroelectric phase to the first and second ferroelectric phases, and having characteristics defined such that an average direction of long axes of liquid crystal molecules does not coincide with a direction normal to a layer of said liquid crystal at a zero applied voltage and coincides therewith at a nonzero first or second voltage.

10. A method of driving a liquid crystal display device of an active matrix type, comprising the steps preparing an antiferroelectric liquid crystal display device having one substrate on which a plurality of pixel electrodes and a plurality of active elements connected to said pixel electrodes are arranged in a matrix form, the other substrate on which a counter electrode opposing said pixel electrodes is formed, and an antiferroelectric liquid crystal sealed between said substrates and having first and second ferroelectric phases in which liquid crystal molecules have different aligned states, an antiferroelectric phase, and an intermediate optical state, between the ferroelectric phases and the antiferroelectric phase, caused by a phase transition precursor phenomenon in accordance with an applied electric field, and exhibiting an antiferroelectric-ferroelectric phase transition precursor phenomenon in which the molecules move in accordance with the electric field for changing the aligned state of said liquid crystal molecules from the antiferroelectric phase to the first and second ferroelectric phases;

simultaneously applying, between said pixel and counter electrodes, an initializing voltage for setting the liquid crystal in one of the first and second ferroelectric phases and the antiferroelectric phase for a first half selection period included in a selection period of each pixel constituted by one of said pixel electrodes, said counter electrode, and said antiferroelectric liquid crystal sealed between said pixel and counter electrodes, the selection period of each pixel including the first half selection period and a second half selection period; and applying a write voltage between said pixel and counter electrodes for the second half selection period, the write voltage changing in accordance with a display gradation level and setting said liquid crystal in the intermediate optical state caused by the phase transition precursor phenomenon.

11. A method according to claim 10, wherein the first half selection period has a common timing for a plurality of rows of a matrix, and the second half selection period has different timings for the respective rows of the matrix.

12. A method according to claim 11, wherein said liquid crystal essentially consists of one material selected from the group consisting of an antiferroelectric liquid crystal having a difference of not less than 3V between a voltage for changing said liquid crystal from the ferroelectric phase to the antiferroelectric phase and a voltage for changing the liquid crystal from the antiferroelectric phase to the ferroelectric phase, an antiferroelectric liquid crystal exhibiting the antiferroelectric phase only in an applied voltage range of ±0.7V, and an antiferroelectric liquid crystal having characteristics defined such that an average direction of long axes of the liquid crystal molecules does not coincide with a direction normal to a layer of said liquid crystal at a zero applied voltage and coincides therewith at a nonzero first or second voltage.

13. An antiferroelectric liquid crystal display apparatus comprising:

a liquid crystal display cell having one substrate on which pixel electrodes and active elements connected to said pixel electrodes are arranged in a matrix form, and the other substrate on which a counter electrode opposing said pixel electrodes is formed;

an antiferroelectric liquid crystal display device having an antiferroelectric liquid crystal sealed in said liquid crystal cell and having first and second ferroelectric phases in which aligned state of liquid crystal molecules are different, an antiferroelectric phase, and an intermediate optical state between the ferroelectric phase and the antiferroelectric phase caused by a phase transition precursor phenomenon in accordance with an applied electric field, and exhibiting an antiferroelectric-ferroelectric phase transition precursor phenomenon in which the molecules move in accordance with the electric field for changing the aligned state of said liquid crystal molecules from the antiferroelectric phase to the first and second ferroelectric phases; and driving means, connected to said active elements, for selecting said pixel electrode during a first half selection period and a second half selection period, applying an initializing voltage for setting said liquid crystal in the first or second ferroelectric phase or the antiferroelectric phase to said pixel electrode through a corresponding one of said active elements during the first half selection period, and applying, to said pixel electrode through said corresponding active element, a voltage for setting the intermediate optical state changing in accordance with a display gradation level of a corresponding pixel and caused by the phase transition precursor phenomenon during the second half selection period.

14. A apparatus according to claim 13, wherein said driving means simultaneously applies the initializing voltage to said pixel electrodes of a plurality of rows of a matrix through corresponding ones of said active elements during the first half selection period, and applies the voltage for setting said liquid crystal in the intermediate optical state to said pixel electrodes of each row of said matrix through said corresponding active elements at different timings during the second half selection period.

15. A apparatus according to claim 14, wherein said liquid crystal essentially consists of one material selected from the group consisting of an antiferroelectric liquid crystal having a difference of not less than 3V between a voltage for changing said liquid crystal from the ferroelectric phase to the antiferroelectric phase and a voltage for changing the liquid crystal from the antiferroelectric phase to the ferroelectric phase, an antiferroelectric liquid crystal exhibiting the antiferroelectric phase only in an applied voltage range of ±0.7V, and an antiferroelectric liquid crystal having characteristics defined such that an average direction of long axes of the liquid crystal molecules does not coincide with a direction normal to a layer of said liquid crystal at a zero applied voltage and coincides therewith at a nonzero first or second voltage.

* * * * *